US009606521B2

(12) United States Patent
Reid et al.

(10) Patent No.: US 9,606,521 B2
(45) Date of Patent: Mar. 28, 2017

(54) CHAINABLE PLUG-INS

(71) Applicant: ROCKWELL AUTOMATION TECHNOLOGIES, INC., Mayfield Heights, OH (US)

(72) Inventors: Douglas W. Reid, Mentor, OH (US); Joseph Bronikowski, West Berlin, WI (US); Michael Kalan, Highland Heights, OH (US); Steven John Kowal, Milwaukee, WI (US); Subbian Govindaraj, Solon, OH (US); Taryl Jasper, S. Euclid, OH (US); Kenneth Plache, Scottsdale, AZ (US); Douglas J. Reichard, Fairview Park, OH (US); Charles Rischar, Chardon, OH (US)

(73) Assignee: Rockwell Automation Technologies, Inc., Milwaukee, WI (US)

( * ) Notice: Subject to any disclaimer, the term of this patent is extended or adjusted under 35 U.S.C. 154(b) by 766 days.

(21) Appl. No.: 13/663,347

(22) Filed: Oct. 29, 2012

(65) Prior Publication Data
US 2013/0123954 A1 May 16, 2013

Related U.S. Application Data

(60) Provisional application No. 61/559,020, filed on Nov. 11, 2011.

(51) Int. Cl.
G05B 15/00 (2006.01)
G05B 19/02 (2006.01)
G05B 19/042 (2006.01)

(52) U.S. Cl.
CPC ........... *G05B 19/02* (2013.01); *G05B 19/042* (2013.01)

(58) Field of Classification Search
CPC ...... G05B 19/02; G05B 19/042; G06F 3/1225
USPC .......................................................... 700/83
See application file for complete search history.

(56) References Cited

U.S. PATENT DOCUMENTS

| 7,254,814 | B1* | 8/2007 | Cormier et al. | 718/106 |
|---|---|---|---|---|
| 7,644,161 | B1* | 1/2010 | Graupner et al. | 709/226 |
| 2005/0155014 | A1* | 7/2005 | Andrade et al. | 717/105 |
| 2007/0044086 | A1* | 2/2007 | Sampath | 717/168 |

(Continued)

FOREIGN PATENT DOCUMENTS

| CN | 101303762 A | 11/2008 |
|---|---|---|
| CN | 101535952 A | 9/2009 |
| CN | 102033743 A | 4/2011 |

OTHER PUBLICATIONS

Haupert "The PiVis Framework for Visualization of Digital Object Memories" from "2011 Seventh International Conference on Intelligent Environments", p. 179-185, Jul. 25-28, 2011.*

(Continued)

*Primary Examiner* — Kenneth M Lo
*Assistant Examiner* — Yuhui R Pan
(74) *Attorney, Agent, or Firm* — Fletcher Yoder, P.C.

(57) ABSTRACT

An automation control and monitoring system is provided that includes chainable plug-ins that may work in combination with one another to transform data or generate events. Resources of the automation control and monitoring system may be polymorphically defined based upon a generalized object model. The chainable plug-ins may be chained to make use of and/or affect a resource of any type.

19 Claims, 10 Drawing Sheets

(56) References Cited

U.S. PATENT DOCUMENTS

2008/0052615 A1    2/2008  Almeida
2008/0288487 A1*  11/2008  Mehrotra .......... G06F 17/30014

OTHER PUBLICATIONS

Chinese Office Action for CN Application No. 201210452565.4 Dated Feb. 26, 2016; 13 Pages.

* cited by examiner

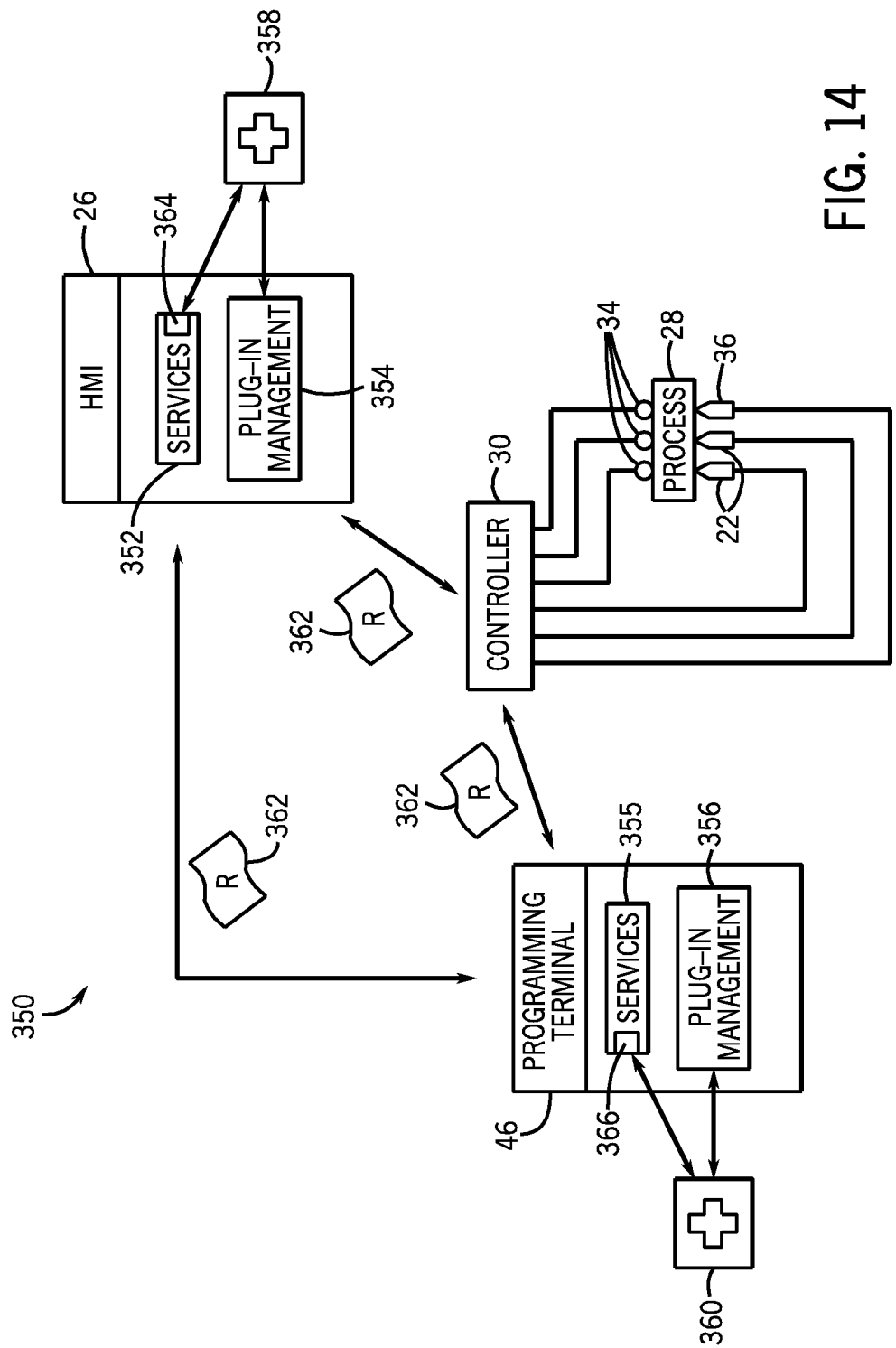

CHAINABLE PLUG-INS

This application is a Non-Provisional of U.S. Provisional Patent Application No. 61/559,020, entitled "Chainable Plugin Business Logic Through a Generalized Object Model", filed Nov. 11, 2011, which is herein incorporated by reference.

BACKGROUND

Embodiments of the present disclosure relate generally to the field of automation control and monitoring systems. More particularly, embodiments of the present disclosure relate to chainable plug-in architecture of the automation control and monitoring systems.

A wide range of applications exist for automation control and monitoring systems, particularly in industrial settings. Such applications may include the powering of a wide range of actuators, such as valves, electric motors, and so forth, and the collection of data via sensors. Typical automation control and monitoring systems may include one or more components, such as: programming terminals, automation controllers, input/output (I/O) modules, and/or human-machine interface (HMI) terminals.

The human machine interfaces or "HMIs" are commonly employed for monitoring or controlling various processes. The HMIs may read from or write to specific registers such that they can reflect the operating state of various machines, sensors, processes, and so forth. The interfaces can also write to registers and memories such that they can, to some extent, control the functions of the process. In monitoring functions alone, little or no actual control is executed. In many other settings, similar devices are employed, such as in automobiles, aircraft, commercial settings, and a host of other applications. In many applications, the interface may not communicate with a remote device or process, but may be operated in a stand-alone manner.

In these interface devices, the objects used in the interface may correlate to different controls, monitors, or any other parameter of an industrial automation device. Some of these objects may have visual representations on the interface devices, while other objects may not be visually represented but may be accessible for configuration and programming by a user. A user may desire to manipulate these objects, such as by creating new objects, copying objects, editing objects, etc., to create and customize an interface.

Each of the components in an automation control and monitoring system may make use of state information of one or more objects (e.g., control programs, tags, module configuration, and HMI screens) of the control and monitoring system. From time to time, the components may be used to modify the state information of the objects. Thus, the components may need to communicate the change of states to the control and monitoring system, such that the other components may be apprised of state-changes to the objects of the control and monitoring system. Indeed in some cases the change of states may include the addition or deletion of certain objects within the control and monitoring system. Traditional approaches to communicate the state of an control and monitoring system object, for example, have included providing an entire state of the object to the control and monitoring system. It is now recognized that such approaches are sometimes inefficient, providing more information than is necessary to describe a changed state of objects within the control and monitoring system. Providing the entire state of an object may result in bandwidth inefficiencies in communicating the state data as well as processing inefficiencies in consuming and using the data. Further, it is now recognized that such approaches of providing full state data may, in some cases, provide increased potential for inadvertent overwriting of other state changes provided in the control and monitoring system.

Further, traditional approaches have relied upon centralized control and monitoring. For example, traditional control and monitoring systems have relied upon centralized data models that describe the control system. The reliance on centralized data models may result in processing inefficiencies and increased dependencies on components (e.g., a controller) hosting the centralized data models.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

Present embodiments provide a novel approach to communicating state change of objects between components in an automation control and monitoring system. As state changes occur within the control and monitoring system, only the changed data is communicated to the other components within the control and monitoring system. For example, the control and monitoring system objects may include control programs, tags, module configuration, and graphics for HMI screens. When elements of these objects change, the changed elements may be provided to components that store state information of the objects in a data-driven manner. By only providing the changed elements, rather than providing the full set of elements for an object, the amount of data transferred to the components may be significantly reduced. Additionally, when an object is deleted, the full state of an object may not be required. Instead, a mere indication of the deleted object may be provided, thus reducing the amount of data to be transferred when the object has been deleted. Further, providing the changes in a data-driven manner may enable the communication to be agnostic, or not dependent upon, a specific programming technology.

Additionally, the invention provides a novel approach to applying the communicated changes and/or distributed commands using execution engines distributed throughout the control and monitoring system to asynchronously execute commands based upon the changes. For example, one or more of the components of the control and monitoring system (e.g., a smart I/O device, a programming terminal, a PLC, and HMI, etc.) may each include an embedded execution engine. The execution engines may be stored on a tangible, non-transitory, computer-readable medium of the components. When triggered (e.g., by receiving changed state information), the embedded execution engines on the various components of the control and monitoring system may asynchronously respond based upon the trigger or scheduled execution time. For example, the distributed commands may be user and/or system defined command scripts that react to state changes in a one or more ways. By enabling execution of control logic through the execution engines embedded on components of the control and monitoring system, more efficient processing may occur. For example, such an execution scheme may take better advantage of multiple central processing unit (CPU) cores by distributing the logic throughout the control and monitoring system.

DRAWINGS

These and other features, aspects, and advantages of the present embodiments will become better understood when the following detailed description is read with reference to the accompanying drawings in which like characters represent like parts throughout the drawings, wherein:

FIG. 14 illustrates an automation control and monitoring system that uses chainable plug-ins to modify functions of the control and monitoring system.

DETAILED DESCRIPTION

Typically, control and monitoring systems have relied heavily on automation controllers such as programmable logic controllers (PLCs) and automation controller programming (e.g., PLC programming) to affect the control and monitoring systems when state changes are communicated. Automation controller programming relies heavily on event-based and/or schedule-based execution of tasks and/or logic (e.g., machine-readable instructions written in a programming language, such as relay ladder logic) to affect change in the control and monitoring system. The automation controllers are often used to consume all input data, calculate and distribute output data, process changes to the data, and distribute data to the components of the control and monitoring system. Unfortunately, such heavy reliance on a centralized data model hosted and affected by a component of the control and monitoring system (e.g., the automation controllers and automation controller programming) has provided several inefficiencies. For example, as the number of scheduled and event-based tasks for the centralized model increase, degraded performance may occur because many additional changes to a single model may result. Further, the heavy use of the centralized model (e.g., via the automation controllers) creates a more centralized approach to processing control logic, resulting in inefficient execution of control logic, single-points of failure (e.g., when the automation controllers fail, the entire control and monitoring system may fail), and may provide processing strain on the automation controllers.

In accordance with present embodiments, by utilizing a distributed data model, distributed state change communication, and distributed command execution, the control and monitoring system may become more agile. For example, by providing increased collaborative abilities, increased data redundancy, and processing load-balancing throughout the control and monitoring system, present embodiments exhibit a more robust and agile automation control and monitoring environment.

The Robust Control and Monitoring System

Figure 1:
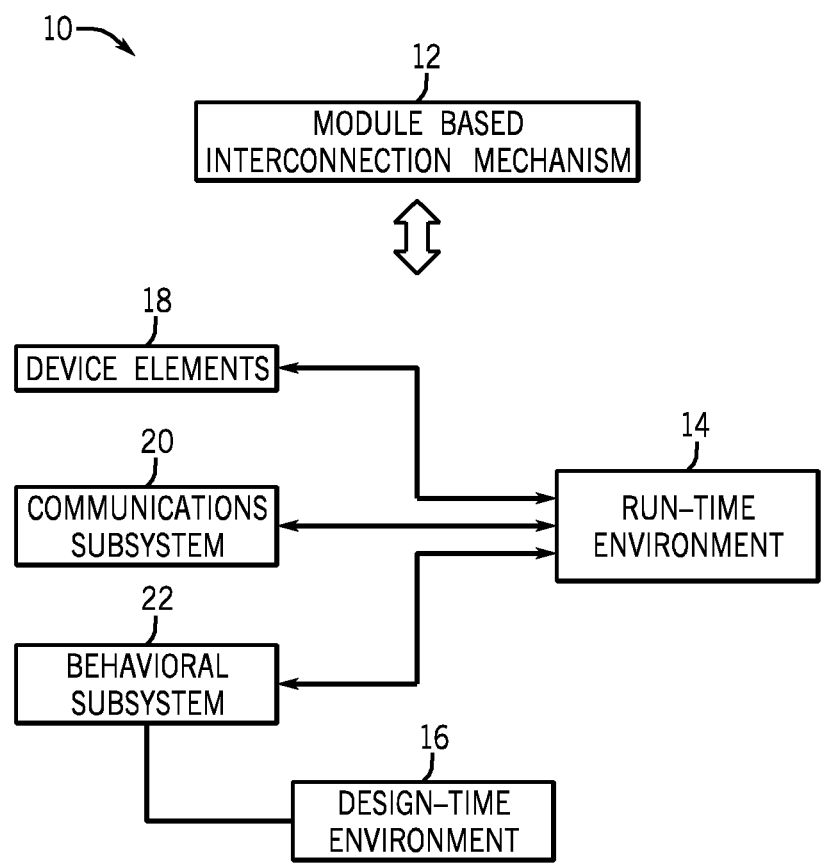
FIG. 1 is a general overview of a framework for portions of an automation control and monitoring system in accordance with certain aspects of the present invention.

A number of facets, components and processes will be described through the following discussion. By way of introduction, a general system overview is in order that situates these innovations in context. FIG. 1 is a diagrammatical representation of an control and monitoring software framework 10 for an interface in accordance with an embodiment of the present disclosure. The framework 10 facilitates building functional software by utilizing a module based interconnection mechanism 12, which inherently supports dynamic manipulation and configuration. This dynamic manipulation and configuration ability facilitates efficient provision of feature-rich configuration environments for configurable interfaces. That is, as described below, individual device elements are provided as standalone code that can be individually programmed, pre-written for use, as in a library, customized in their function and appearance in screens, and interconnected to provide information to a user as well as control and monitoring functions.

The framework 10 includes two interrelated software environments that can reside on a single system (e.g., computer). Specifically, a run-time environment 14 enables an operator (e.g., a human user) to interact with an application, such as a process during run-time (e.g., during use of the interface, typically during interaction with or observance of a process in operation). A design-time environment 16 permits a designer to configure the interface and its components. For example, a system may graphically present run-time information to an operator via the run-time environment 14 on a display (e.g., computer or interface device screen). Further, the system may include means (e.g., a keypad) for accepting operator input that can be detected and managed via the run-time environment 14. The environments interact as described in detail below, in innovative ways to provide greatly enhanced programming and use of the interface.

The run-time environment 14 includes or provides access to device elements 18. The device elements 18 are software components that may include any accessible or configurable element in a software environment. For example, the device elements 18 include software components, such as "ActiveX" controls or ".NET" components that are managed by the run-time environment 14. "ActiveX" and ".NET"

refer to object-oriented concepts, technologies and tools. Those skilled in the art will be well-acquainted with such programming approaches generally. In the present context, such standards should be taken as merely examples, and "device elements" should be understood as including any generally similar components or self-sufficient programs that can be run as quasi-independent elements, sometimes referred to as "objects". Other standards and platforms exist for such elements, typically championed by different companies or industry groups.

Because such device elements are basic to certain of the concepts set forth herein, a few words of introduction are in order. Device elements generally include four features: properties, methods, connections (or connection points) and communications interfaces. Properties, in this context, are attributes that can be adjusted, such as to define an image or representation of the element in a screen view, as well as its location on the screen, and so forth. In this context, a method is an executable function (sometimes referred to herein as the elements "functionality" or "state engine"), and defines an operation performed by execution of the element. A connection, in this context, is a link between elements, and can be used to cause data (read from a memory or written to a memory) to be sent to another element.

Specific examples of device elements 18 may include software pushbuttons, timers, gauges, PLC communication servers, visualizations (such as screens that illustrate state of components within the automation control and monitoring system), and applications. In general, virtually any identifiable function may be configured as such an element. Moreover, as discussed below, such elements may communicate with one another to perform a wide range of display, monitoring operations and control functions. It should be noted that device elements 18 do not require special limitations for supporting a design mode. Also, while elements associated with an image are quite useful, particularly for visualizations, many elements may not have a visual representation, but may perform functions within an HMI, such as calculations, or even management and data exchange between other elements.

The run-time environment 14 typically operates using a communications subsystem 20. The communications subsystem 20 is adapted to interconnect the device elements 18. In practice, the communications subsystem 20 may be thought of as including the connections of the device elements 18. However, it may include a range of software, hardware and firmware that send data to and receive data from external circuits, such as automation controllers, other computers, networks, satellites, sensors, actuators, and so forth.

The run-time environment 14 typically operates using a behavioral subsystem 22, which is adapted to manage the behavior of the device elements 18. For example, responsibilities of the behavioral subsystem 22 may include the following: place and move device elements, modify device elements, group device elements on interchangeable screens, save and restore screen layouts, manage security, save and restore connection lists, and supply remote access to the run-time environment 14. Here again, in practice, such behaviors may be defined as part of the profile (i.e., the "method" or "state engine") of each device element.

The design-time environment 16 includes an advanced implementation of the behavioral subsystem 22 that facilitates direct or indirect manipulation of the run-time environment 14, without impeding or compromising the behavior of the run-time environment 16. That is, design and reconfiguration of the device elements 18 can be done even while an interface is operating. The behavioral subsystem 22 extends access to the run-time environment 14 via remote provision of the design-time environment 16, such as in a conventional browser. The behavioral subsystem 22 allows a designer to interact with and change aspects of the run-time environment 14 of an HMI via a remote programming terminal by serving the design-time environment 16 or aspects thereof to the programming terminal from the HMI. For example, an HMI coupled to a laptop via a network may provide a user with configuration capabilities by serving up a specific design-time environment 16 to the laptop via the network.

Details and examples of how this may be done are provided below. In current embodiments, the design-time environment 16 may be a product of combining Dynamic Hypertext Markup Language (DHTML) and an Active Server Page (ASP) server scripting to serve dynamic content to a browser. An ASP script is specially written code that includes one or more scripts (i.e., small embedded programs) that are processed on a server (e.g., Web server) before the page is sent to a user. Typically, in conventional usage, such script prompts a server to access data from a database and to make a change in the database. Next, the script typically builds or customizes the page before sending it to the requestor. As discussed below, such scripting is used in the present framework quite differently, such as to build visualizations without prior knowledge of either the functionality of device elements, or their interrelationships.

By facilitating changes to device elements, the design-time environment 16 allows the designer to make interchangeable design-time models or specialized implementations of the behavioral subsystem 22. A specific example of a design-time implementation of the behavioral subsystem 22 includes a Web-based design-time environment 16, which extends access to a run-time environment 14 on an HMI via a TCP/IP connection between the HMI and a remote device. The Web-based design-time environment 16 facilitates management of the device elements without compromising run-time performance or security. In one specialized implementation the behavioral subsystem 22 gives designers the ability to manipulate aspects of the run-time environment 14 using a Web browser that is capable of accessing a related interface or HMI. As noted above, and as described in detail below this is achieved by using a combination of dynamic content, scripting, and configuration of the device element properties.

Figure 2:
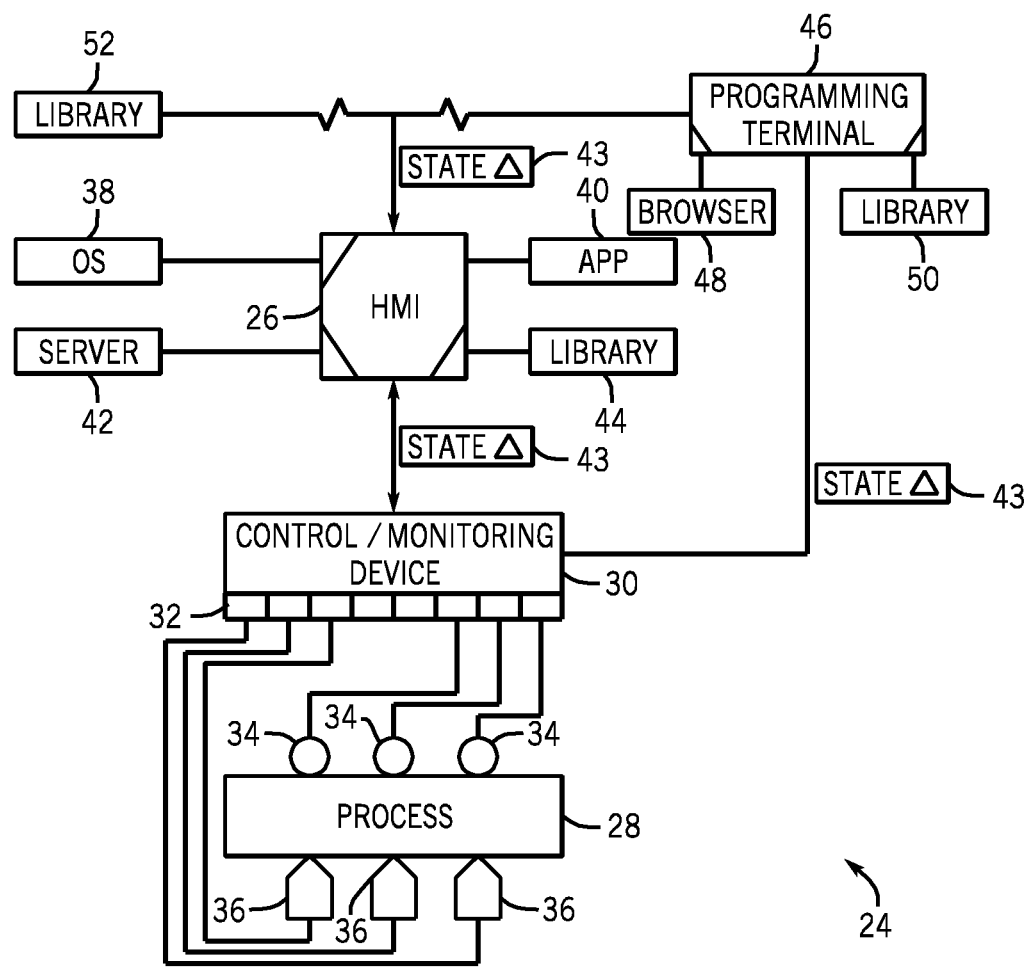
FIG. 2 is a diagrammatical overview of an automation control and monitoring system. in accordance with an embodiment of the present invention.

FIG. 2 is a diagrammatical representation of a control and monitoring system 24, such as for industrial automation, implementing the framework described above in accordance with an embodiment of the present disclosure. The system 24 includes an HMI 26 adapted to interface with networked components and configuration equipment. The system 24 is illustrated as including an HMI 26 adapted to collaborate with components of a process 28 through a control/monitoring device 30 (e.g., a remote computer, automation controller, such as a programmable logic controller (PLC), or other controller). The HMI 26 may physically resemble existing hardware, such as a panel, monitor or stand-alone device.

Collaboration between the HMI 26 and components of the process 28 may be facilitated by the use of any suitable network strategies. Indeed, an industry standard network may be employed, such as DeviceNet, to enable data transfer. Such networks permit the exchange of data in accordance with a predefined protocol, and may provide power for operation of networked elements. As noted above, while reference is made in the present discussion to networked systems and to systems incorporating controllers and other equipment, the HMI 26 and programming techniques described may be equally well applied to non-networked components (e.g., GPS displays, game displays, cell phone displays, tablet displays, etc.) and to networked systems outside the industrial automation field. For example, the arrangements and processes described below may be used in facilities management, automotive and vehicular interfaces, computer numeric control (CNC) machines, point of sale (POS) systems, control interfaces for commercial markets (e.g., elevators, entry systems), and so forth, to mention only a few.

The run-time or operation environment 14 constructed and managed by a corresponding behavioral subsystem, is stored on and resident in the HMI 26. For example, such a behavioral subsystem can be adapted to load the application configuration framework (e.g., 10) from a storage location, such as during initial manufacture or setup of the HMI 26. When loaded, the stored application framework may be adapted to create screens and locate user interface device elements (actual images or pictorial representations corresponding to the elements) in the screens. These applications, screens, and user interface elements are each types of device elements. As described below, the HMI 26 includes a stored application that dictates the layout and interaction of the device elements. The Web-based design-time environment 16, which is based on a run-time engine, is also loaded and resident on the HMI 26. The design-time environment 16 may be adapted to handle advanced features (e.g., security management) for both design-time and run-time environments.

The HMI 26 may be adapted to allow a user to interact with virtually any process. For example, the process may comprise a compressor station, an oil refinery, a batch operation for making food items, a mechanized assembly line, and so forth. Accordingly, the process 28 may comprise a variety of operational components, such as electric motors, valves, actuators, sensors, or a myriad of manufacturing, processing, material handling and other applications. Further, the process 28 may comprise control and monitoring equipment for regulating process variables through automation and/or observation. The illustrated process 28 comprises sensors 34 and actuators 36. The sensors 34 may comprise any number of devices adapted to provide information regarding process conditions. The actuators 36 may similarly include any number of devices adapted to perform a mechanical action in response to an input signal.

As illustrated, these sensors 34 and actuators 36 are in communication with the control/monitoring device 30 (e.g., an automation controller) and may be assigned a particular address in the control/monitoring device 30 that is accessible by the HMI 26. The sensors 34 and actuators 36 may be in direct communication with the HMI 26. These devices may be utilized to operate process equipment. Indeed, they may be utilized within process loops that are monitored and controlled by the control/monitoring device 30 and/or the HMI 26. Such a process loop may be activated based on process inputs (e.g., input from a sensor 34) or direct inputs (e.g., operator input received through the HMI 26).

The server software on the interface permits viewing of the development environment, and direct reconfiguration of the interface (particularly of the device elements and their associated appearance and functionality) without the need for special viewing or configuration software. This benefit flows from the fact that the device elements and the design-time environment itself is resident in the HMI 26, and "served up" by the HMI 26 to a browser or other general purpose viewer on a programming terminal 46. In other words, necessary support for external computer workstations (e.g., laptop and desktop computers) may be reduced or eliminated. It should be noted that reference to a "browser" for viewing and modifying configuration of the interfaces is not limited to Web browsers or to any particular browser. References to a browser are intended to be exemplary. More generally, the term "browser" is utilized herein to reference software which includes any general purpose viewer.

The HMI 26, through the programming of the device elements as described below, may be thought of as including instructions for presenting one or more screen views or visualizations, and device elements executed upon interaction with the HMI 26 by reference to the screen views (e.g., pressing a button, touching a location of a screen, and the like). The screen views and device elements may be defined by any desired software or software package. For example, the screen views and device elements may be called by or executed by an operating system 38. The device elements, as discussed above, in accordance with present embodiments, may be objects conforming to ".NET" or "ActiveX" standards. The operating system itself may be based upon any suitable platform, such as Window CE, OS-X, etc. As referenced herein, the device elements and tools support Web services or technology for transmitting data over networks (e.g., the Internet). These device elements thus follow a set of rules regarding information sharing and are adapted for use with various scripting and programming languages, as described below. Such device elements enable provision of interactive content to outside applications such as a LAN, WAN, an intranet, an extranet, or even the World Wide Web. Accordingly, the operating system 38 and the various device elements facilitate dynamic configuration of the HMI 26 through a browser 48 by allowing configuration access (e.g., serving up) to the browser 48.

For example, such configuration access includes access for instantiation of device elements. In other words, new device elements can actually be created and implemented from the browser 48. Again, it should be noted that the browser 48 does not require actual functional access. Indeed, in one embodiment, requests via the browser 48 result in a "draw" sequence of operations based on data functionality and content of device elements in a container, thus allowing illustration of the device element representations and access to their configuration without actually serving up functional aspects. This allows for configuration via a remote workstation without necessitating technical support for the remote workstation.

In addition to the operating system 38 and device elements as described above (and as described in greater detail below), the HMI 26 includes an application or application layer 40. The application, which may itself comprise a device element, facilitates access to and acquisition of information from the various device elements of the HMI 26. In particular, the application 40 represents a first level in a multi-level device element that can be enumerated for execution. The application 40 in a practical implementation may comprise a user application in the form of an XML page. The user application is then interacted with by the user or operator, as well as by the designer as described in greater detail below.

The screen views and device elements may be described as independent executable pieces of software. In a present implementation, the screen views are defined by appropriate code written in a markup language (e.g., Hypertext Markup Language or HTML). Thus, the configuration of graphical interface screens for the HMI 26 may be performed without the use of conversion programs. Further, by programming of the device elements, the screen views may be developed directly on the HMI 26 via resident server software (designated as server 42) that makes the resident development environment available for remote access. Specifically, in one embodiment, representations of certain device elements (e.g., ActiveX controls) are served up to the browser 48 without serving up the software components themselves. Because a development or design-time environment may be accessed via a browser 48, the need to download changes to the screens and to update remote configuration software applications can be eliminated.

As noted above, device elements may include functionality by which they read from or write to specific memory or registers of memory, typically in other devices (but which could also be within the HMI). For example, a particular function may correspond to writing to or reading from a register 32 of control/monitoring device 30. In a simple case, for example, an object accesses a piece of data (e.g., a state of a component as determined by a sensor), and generates an output signal to write a value corresponding to the state of a different networked device. As will be discussed in more detail below, such state information may be communicated via state deltas 43. For example, in the embodiment depicted in FIG. 2, the control/monitoring device 30 and HMI 26 may communicate state information using state deltas 43. Further, the programming terminal 46 may communicate state information with the HMI 26 and control/monitoring device 30 using the state deltas 43, as well.

Much more complex functionality can, of course, be configured. In an industrial control and monitoring context, for example, such device elements may emulate operation of a range of physical components, such as a momentary contact push button, a push button with delayed output, a switch, and so forth. Many pre-programmed device elements may be available for use by the HMI 26. Such functional modules may be accessible via a network, or may be resident on the HMI 26, or resident on a separate device directly linked to the HMI 26. In this way, an HMI supplier or software supplier may provide many possible building blocks from which screens and complex control and monitoring functions may be programmed. Indeed, a library 44 of available device elements may reside on the HMI 26 to facilitate configuration of the HMI 26, as described below. The screen instructions may call upon the device elements for performing desired functions based upon operator inputs, and these instructions may be programmed into versions of the pre-programmed elements. For example, the operator may provide initiating inputs by touching a location on a touch screen or depressing keys on a keyboard. Based upon the screen instructions and the device elements associated with the instructions (e.g., with specific locations triggering calls or execution of pre-configured device elements) the desired functions may then be executed. Accordingly, the operator is enabled to interact with a process, typically to change screen views, write to registers, or command the generation of other output or control signals. In a stand-alone implementation, the interactions may simply recall or store data, change screens, and so forth.

One or more separate interface screens may be employed, with some HMIs having many such screens and a great number of device elements. Each device element may, in turn, be uniquely programmed to consider specific inputs, perform specific functions, and generate signals for specific outputs. A plurality of such device elements can be loaded and hosted in a single software "container" (e.g., ActiveX container) as described below.

The HMI 26 may be configured by interacting directly with a panel or screen on the HMI 26 itself (if one is present), but in many cases configuration will be performed from the remote programming terminal 46. For example, access is provided directly to the resident library 44 and/or operating system 38 and application 40 via a browser 48 or similar application. In a present implementation, no other specialized software is required at the programming terminal 46. Indeed, the server 42 resident on the HMI 26 may provide access to the device elements in library 44. By storing the device elements in library 44 directly on the HMI 26, the risk of version conflicts and so forth are eliminated or reduced. Additionally, the HMI 26 may be directly connected to the programming terminal 46, or accessed by reference to an IP address (Internet Protocol address) assigned to the HMI 26.

Access control schemes may be used to limit the ability to change screens and device elements. For example, a password or user access status may be required to gain such access. Further, in a presently contemplated embodiment, the programming terminal automatically recognizes the HMI 26 or the terminal on which the HMI 26 is resident as a device upon being coupled to the programming terminal 46 (e.g., similar to an external memory or drive). Thus, once connected to the programming terminal, the HMI 26 may simply be "recognized" as a device that can be accessed (providing the configuration screen and tools described below).

Once the device elements then resident on the HMI 26 are accessible to the programming terminal 46, aspects of the HMI 26 can be modified or updated directly on the HMI 26 via the communication link from the programming terminal 46. For example, a user may wish to update a particular HMI graphic to provide data, such as historical data or trending relating to information being received from a newly installed sensor 34. Additionally, the user may find it desirable or convenient to update the HMI graphic for presentation of such data while in an off-line mode (e.g., without immediately implementing the changes). In such a scenario, the user may link to the library 44 of available device elements via the programming terminal 46 and use them to modify the HMI graphic or functionality in a development environment.

It should be noted that additional device elements can be added to the library 44. For example, if a trending device element is not resident on the HMI 26, a user can download such an element to the HMI 26 from a configuration library 50 resident on the programming terminal 46. Alternatively, a user could access the trending device element from a resource library 52 accessible via a network (e.g., the Internet), either directly to HMI 26 or through the programming terminal 46. This may be particularly beneficial because new and improved device elements can be downloaded to the HMI 26 individually and on a periodic basis, thus adding new functionality without necessitating the periodic release of new conversion programs or HMI operating systems, or run-time or design-time environment software. The development environment may provide links to such libraries. Further, in embodiments using embedded code (e.g., operating system, server software, device objects, etc.), because the embedded code resides on the HMI 26, version conflicts with the embedded code may be avoided and the necessity for programming terminal software upgrades may be eliminated.

To track the state information of the one or more components of the control and monitoring system 24, the components of the control and monitoring system 24 may use a distributed data model representing various aspects of the control and monitoring system 24. For example, the distributed data model may enable multiple cached copies of a data model representing the control and monitoring system 24 to exist within the control and monitoring system 24 (e.g., at one or more of the components of the control and monitoring system 24). As will be described in more detail below, the distributed data model may work in conjunction with delta scripting and distributed command handling. The delta scripting may enable one or more components of the control and monitoring system 24 to determine state changes to the data model, generate a delta script that contains only the changes to the data model and/or the entire data model, and provide the delta script to other components of the control and monitoring system 24. The other components may consume the delta scripts and apply the data contained within the delta scripts to a locally cached copy of the data model (e.g., distributed copy contained at one of the components of the control and monitoring system 24). Further, as will be discussed in more detail below, certain components of the control and monitoring system 24 may utilize distributed execution engines that enable distributed command handling. Such distributed command handling enables distributed components of the control and monitoring system 24 to handle command execution based upon an event or schedule provided to the distributed components.

By using the distributed data model, the distributed delta communications (e.g., via the delta scripts), and the distributed command execution, the resultant control and monitoring system 24 may be more robust and agile. For example, rather than depending on the centralized data model at a centralized control/monitoring device 30, the distributed copies of the data model may be used to affect changes within the control and monitoring system 24. For example, rather than relying on a centralized data model at the control/monitoring device 30 to affect change on the HMI 26, the HMI 26 may include a copy of the distributed data model, which it relies upon to affect change within the HMI 26. Further, the HMI 26 may receive state deltas 43 (e.g., via delta scripts) that are consumed by the HMI 26 and applied by the HMI 26 to the HMI's local copy of the data model. Additionally, as will be described in more detail below, the HMI 26 may include a local execution engine (e.g., an execution engine that is distributed at the HMI 26) that is useful for execution, at the HMI 26, of commands provided to the HMI 26.

Further, such functionality enables synchronized data stores to be present across the control and monitoring system 24. These synchronized data stores may enable collaboration by enabling multiple users to make changes to an individual data store that will be synchronized with each of the other data stores. Further, because the data stores may cache individual copies of the data of the control and monitoring system 24, offline modifications may be made. For example, through use of data cached in one of the data stores, a user may make modifications to the control and monitoring system 24, even when a controller is unavailable. When the user comes back online (e.g., can access a controller), the modifications made by the user while offline may be synchronized with the other data stores. Accordingly, the users may be able to provide changes to the control and monitoring system 24 in a more consistent and reliable manner.

For example, one user may make changes to tag definitions, metadata definitions, may rename elements of a design, may modify alarm settings, change data-types, and/or modify a data log condition in design software, such as Logix™ by Rockwell Automation, Inc. These changes submitted by the user may be made to a local data store. When online, the changes may be propagated to other data stores within the control and monitoring system 24, thus applying the changes across the system 24. When offline, the changes may be retained in the local data store and may be synchronized upon returning online (e.g., reconnecting to a controller of the control and monitoring system 24). Through automatic propagation of changes, redundant change entry may be avoided, saving development efforts. Further, there may be reduced debug and initialization based upon the automatic renaming propagation through the system 24. Further, because these changes may originate throughout the system, flexible workflows may be enabled when different users develop the controller and the HMI.

As mentioned above, by distributing the data model, propagating changes to distributed data model via delta scripts, and distributing command execution, the control and monitoring system 24 may be vastly improved over traditional control and monitoring systems. For example, clients of the control and monitoring system 24 (e.g., components that request data in the data model of the control and monitoring system 24) may be served by any one of the multiple copies of the data model distributed within the control and monitoring system 24. The control and monitoring system 24 may determine which copy to serve the client from based upon one of many deciding factors. For example, a particular distributed data model copy may be chosen to serve data to a client based upon performance efficiencies, such as an efficient network pathway (e.g., which copy is closest to the client, either locally or on the network, or which network pathway has the most bandwidth, etc.). Further, processing consideration may also be factored into such a decision. For example, such a robust control and monitoring system 24 may enable data to be served to a client utilizing load balancing techniques. In one embodiment, the client may be served data from a component that contains a distributed copy of the data model that is known to or likely to serve fewer requests than another component of the control and monitoring system 24. In one example, a control and monitoring system 24 may include two control/monitoring devices 30 (e.g., 2 automation controllers). The control and monitoring system 24 may predict or observe that the first control/monitoring device 30 is receiving more requests for data than the second control/monitoring device 30. Accordingly, the control and monitoring system 24 may determine to serve the client from the second control/monitoring device 30 to avoid over-utilization of the first control/monitoring device 30. Thus, the control and monitoring system 24 may avoid flooding of the control/monitoring devices 30 by balancing the requests based upon the load of components within the control and monitoring system 24. In certain embodiments, this may include supplying requests from a single component to a threshold number of requests or amount of data and moving to an overflow source when the threshold is met. In some embodiments, this may include essentially evenly sharing a load of requests or amount of data in supplying the data.

In addition to the load-balancing capabilities that the distributed data model, delta scripts, and execution engines may provide, these capabilities may also be beneficial for data redundancy in the control and monitoring system 24. For example, one or more components within the control and monitoring system 24 may monitor one or more of the distributed copies of the data model. Upon detecting that the copy is unstable (e.g., a copy that does not accurately represent the distributed model), the unstable copy may be replaced by a stable copy (e.g., a copy that accurately represents the distributed model). The stable copy may be obtained from any of the other copies of the data model distributed in the control and monitoring system 24 that are determined to have a copy that accurately represents the data model.

In some embodiments, a component of the control and monitoring system 24 may access a redundancy pool that provides a pointer to valid copies of the distributed data model or components of the control and monitoring system 24 storing valid copies of the distributed data model. For example, when a client component requests data in data model, it may access the redundancy pool which communicates where the data may be obtained. As discussed above, one or more components of the control and monitoring system 24 may monitor the copies of the data model to determine unstable copies. When one or more unstable copies are detected, a component of the control and monitoring system 24 may remove the pointer to the unstable copy or the component of the control and monitoring system 24 storing the unstable copy. Accordingly, the unstable copy is not accessible via the redundancy pool.

In certain embodiments, after the unstable copy (or the component storing the unstable copy) is removed from the redundancy pool, a component of the control and monitoring system 24 may replace the unstable copy with a stable version, as discussed above. After the unstable copy has been replaced, a component of the control and monitoring system 24 may re-add the replacement stable version (or the component storing the replacement stable version) back to the redundancy pool for future use.

Figure 3:
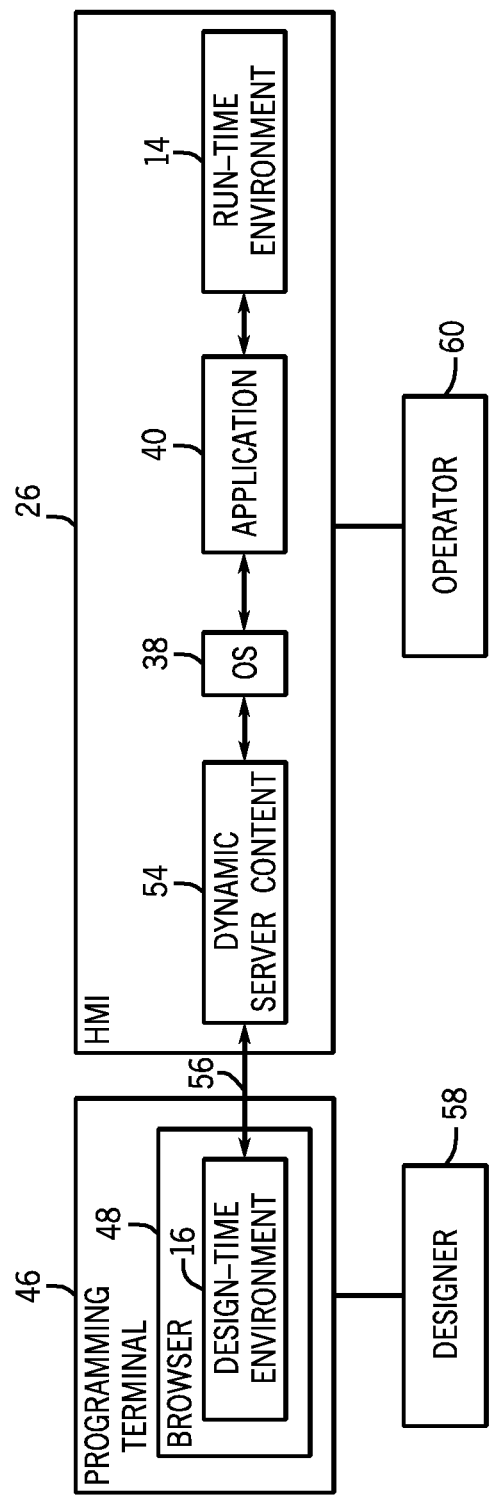
FIG. 3 is an overview of certain of the functional components in an interface and a programming terminal in accordance with an embodiment of the present invention.

To better illustrate the relationship between the design-time and run-time environments, FIG. 3 provides a high-level flow diagram representing interaction between an HMI 26 and a programming terminal 46. More detail regarding such processes is provided below. In general, a platform for the HMI 26 and programming terminal 46 will include the operating system or executive software 38, application software 40, as well as any communication software, a microprocessor, a network interface, input/output hardware, generic software libraries, database management, user interface software, and the like (not specifically represented in FIG. 3). In the illustrated embodiment, a design-time platform and a run-time platform interact within the HMI 26. The design-time platform provides views that are served as the design-time environment 16 to a desktop personal computer platform (e.g., running a suitable operating system 38, such as Windows XP, Windows Vista, or Linux) and the run-time platform cooperates with the design-time platform via the operating system (e.g., Windows CE, Linux). The design-time platform provides dynamic server content 54, while the run-time platform displays views on the HMI 26 itself (if a display screen is provided on the HMI 26). The design-time environment 16 is displayed in a browser 48 (e.g., Web browser or other general purpose viewer).

FIG. 3 represents at a very high level how the design-time environment 16 interacts with the operating system 38, application 40 and run-time environment 14. The arrow 56 represents dynamic exchange of content between the HMI 26 and programming terminal 46. In general, interaction with the design-time environment 16 is the task of a designer 58 who initially configures the HMI screens or visualizations, device elements, their functions and interactions, or who reconfigures such software. The run-time environment 14 is generally interacted with by an operator 60 directly at the HMI 26. It should be noted that while the design-time environment 16 has specific needs, in a current embodiment, it depends heavily on the operating system 38, application 40 and run-time environment 14. The design-time environment 16 and the run-time environment 14 may utilize certain base technologies (e.g., DHTML, HTML, HTTP, dynamic server content, JavaScript, Web browser) to operate respectively in the design-time platform and run-time platform. While, in the illustrated embodiment, the run-time environment 14 and the design-time environment 16 reside on separate platforms, in some embodiments they may reside on the same platform. For example, the design-time platform and run-time platform may be configured as or considered a single platform.

In one embodiment of the present invention, a design-time Web implementation is utilized. This design-time Web implementation offers the speed and flexibility of software running on the design-time platform by using a Web browser (e.g., 48) with DHTML support from the HMI, as noted by the dynamic server content 54 in FIG. 3 and as described below. DHTML is used to perform dynamic manipulation of Web content in the design-time environment 16. Further, the dynamic server content 54 is used in the HMI to serve dynamic Web content to the design-time environment 16. This dynamic client-server environment allows the Web browser to simulate an application running on the design-time platform without requiring a piece of software compiled for a related processor.

Figure 4:
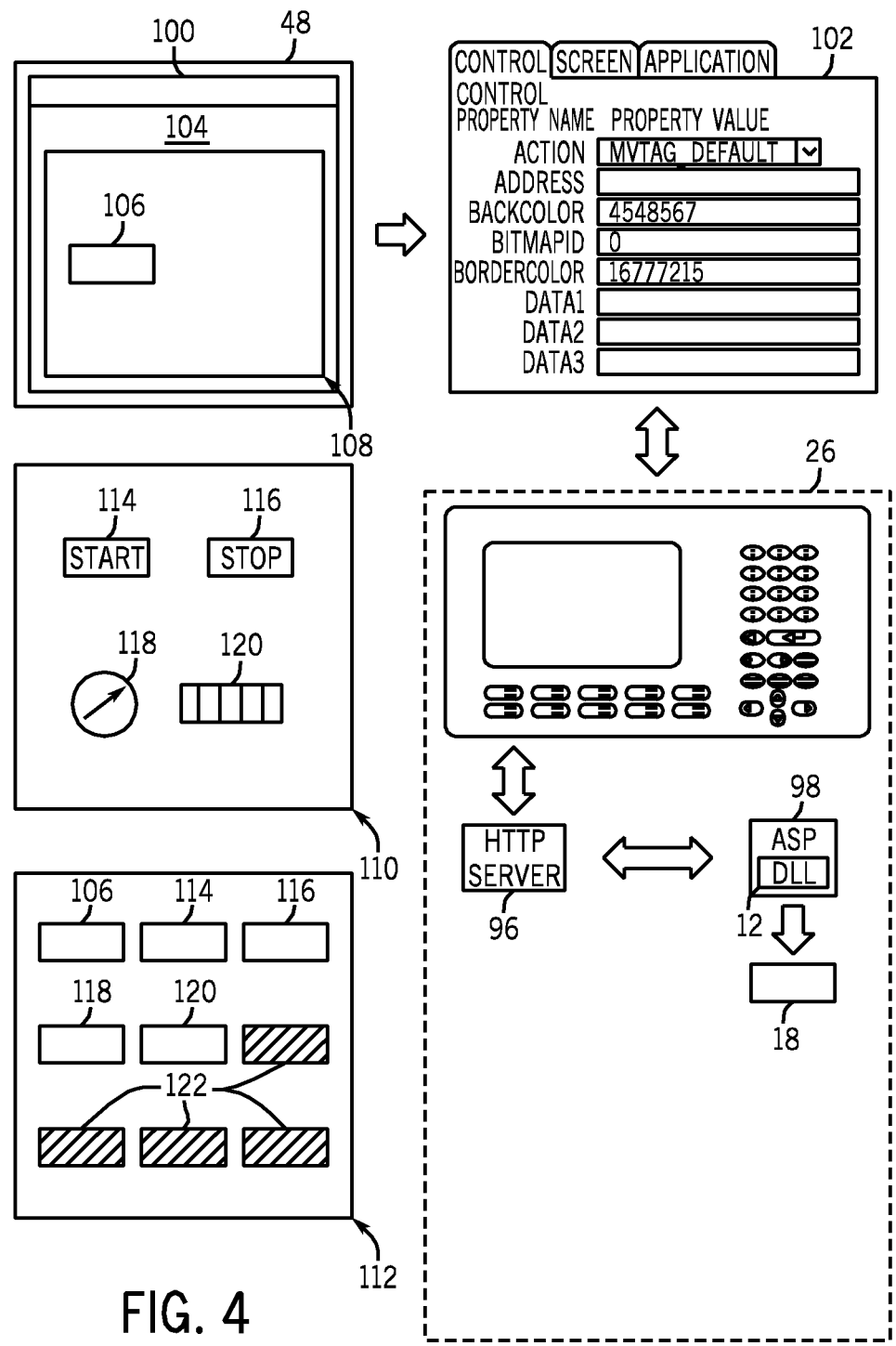
FIG. 4 is an overview of certain views or containers of device elements in accordance with an embodiment of the present invention.

FIG. 4 is a diagram illustrating one or more device elements in a design-time environment in accordance with embodiments of the present techniques. The diagram includes interactions illustrated by relationships between a display 100 (e.g., a screen for browser display), a property editor 102, and the HMI 26.

The design-time environment represented by the configuration screen or display 100 includes static content 104 and dynamic content. The dynamic content includes images corresponding to any displayed or represented device elements 106 (e.g., virtual on/off button, gauge). In one embodiment of the present techniques, the image is specified by an image tag in HTML and is part of a JPEG file created by the HMI as described below. The static content 104 may be created by an active server page (ASP) server or it may preexist in an HTML file. It should be noted that, in some embodiments, only designated designers can edit the static content 104.

The design-time environment represented by the configuration screen or display 100 includes static content 104 and dynamic content. The dynamic content includes images corresponding to any displayed or represented device elements 106 (e.g., virtual on/off button, gauge). In one embodiment of the present techniques, the image is specified by an image tag in HTML and is part of a JPEG file created by the HMI as described below. The static content 104 may be created by the ASP server or it may preexist in an HTML file. It should be noted that, in some embodiments, designated designers only can edit the static content 104.

In the representation of FIG. 4, the device element representation 106 is contained within a view container 108. As will be appreciated by those skilled in the art, a container generally defines a portion of a processing space in which certain device elements are opened and ready for use. The container 108 may thus correspond to a first view container that includes only the elements viewable within the current screen. As discussed above, many such screens may be provided in the HMI. Other screens, such as alternative control or interface screens may be provided in other view containers, such as a container 110. In general, to speed the operation (e.g., changing between screen views) of the HMI, such view containers are predefined and associated with one another by definition of the individual device elements with which they are either associated or within which representations of the device elements are provided. A global container 112 may be defined to include all of the device elements necessary for the various view containers, as well as other elements that may not be represented in any view container. As illustrated in FIG. 4, therefore, view container 108 includes the virtual button 106 which performs a "jog" function and is manifested by a representation in a first screen. New container 110 includes several components, such as a "start" button 114, a "stop" button 116, a virtual gage 118 and a digital readout 120. The global container 112, then, will include all of these device elements for the various view containers, as well as any device elements 122 that are required for operation of the viewable device elements but that are not themselves viewable. Such device elements may include elements that perform computations, trending, communications, and a wide range of other functions.

FIG. 4 also illustrates a property editor 102 in which a user may access various properties of the element 106. As discussed above, the element 106 may also include connections and text associated with the element 106, which may also be configured by the user via an editor, similar to the property editor 102.

In an embodiment, the property editor 102 may interact with the HMI 26 via a query string from the browser (e.g., browser 48 of FIG. 2) to a server 96 (e.g., HTTP server) that is resident on the HMI 26. The server 96 cooperates with an ASP server 98 including the module based interconnection mechanism 12, such as a dynamic-link library (DLL) to receive and respond to queries. The DLL allows for storage of executable routines as separate files, which can be loaded when needed or referenced by a program. In the example set forth above, upon receiving the call, the page is reloaded by the ASP server 98 and the query string is initially parsed resulting in evaluation of the move command. Server side scripts then access the device element 18 represented by the image 106 and to update its location property. The new property information is then updated on the page and the page is passed to the browser 48.

Communicating State Change

Having now discussed the benefits of using the distributed data model in conjunction with the distributed state change notification via the delta scripts and distributed command execution, a more detailed discussion of the distributed state change notification will be provided. As discussed above, FIG. 2 is a diagrammatical representation of an exemplary control and monitoring system 24 adapted to provide component state information using delta scripts in accordance with embodiments of the present techniques. As illustrated, the control and monitoring system 24 may include one or more human machine interfaces (HMI) 26 and one or more control/monitoring devices 30 adapted to interface with components of a process 28. The control/monitoring devices 30 may include one or more processors and a data storage device useful for performing tasks on the control and monitoring system 24 (e.g., process control, remote equipment monitoring, data acquisition, etc.). Further, a programming terminal 46 may enable one or more users to configure attributes of the HMI 26 and/or control/monitoring devices 30.

In the control environment, the state of various objects (e.g., control programs, tags, module configuration, and HMI screens) of the control and monitoring system 24 may be stored in memories (e.g., hard drives, read-only memory, and/or random-access memory) of various components of the control and monitoring system 24 (e.g., a programming terminal 46, the control/monitoring device 30, I/O modules, and/or HMI terminals 26. Each of the components of the control and monitoring system 24 may operate independently in a loosely coupled, asynchronous fashion. Further the components may be implemented with different programming technologies (e.g., C++, Java, and/or C#). As changes are made to the state information of the control environment objects, the state information may need to be synchronized with the state information residing on the other components, such that the components may continually understand the state of the objects within the control and monitoring system 24. In accordance with present embodiments, to stay apprised of state information, automation components that store state information may receive data referred to as state deltas 43 (e.g., state elements that have changed), while not receiving state elements that have not changed and thus are already present in the stored state information on the various components storing the state information. For example, state deltas 43 may include any data that has changed due to an action within the control and monitoring system 24. By providing the state deltas 43 and not providing the unchanged state information, increased efficiency may be observed. For example, in a traditional control and monitoring system 24 with 100 state elements, each of the 100 state elements may be provided to each component storing that object's state information. By only providing the state deltas 43, components of the control and monitoring system 24 may only transmit data for the elements that were changed. Thus, if only one element of the 100 state elements is changed, the 99 other elements would not be transmitted, thus reducing network traffic relative to traditional systems. Further, providing only the state deltas 43 may reduce the potential of inadvertently overwriting state change information that is generated elsewhere within the control and monitoring system 24. For example, in the case of the 100 state elements mentioned above, when all 100 state elements are transmitted to the other components, the 99 unchanged elements may result in an overwrite of changes made to one of those 99 components elsewhere. By providing only the changed elements (e.g., the state deltas 43), the 99 unchanged elements will not be affected by the one element that was changed and communicated to the other components.

Figure 5:
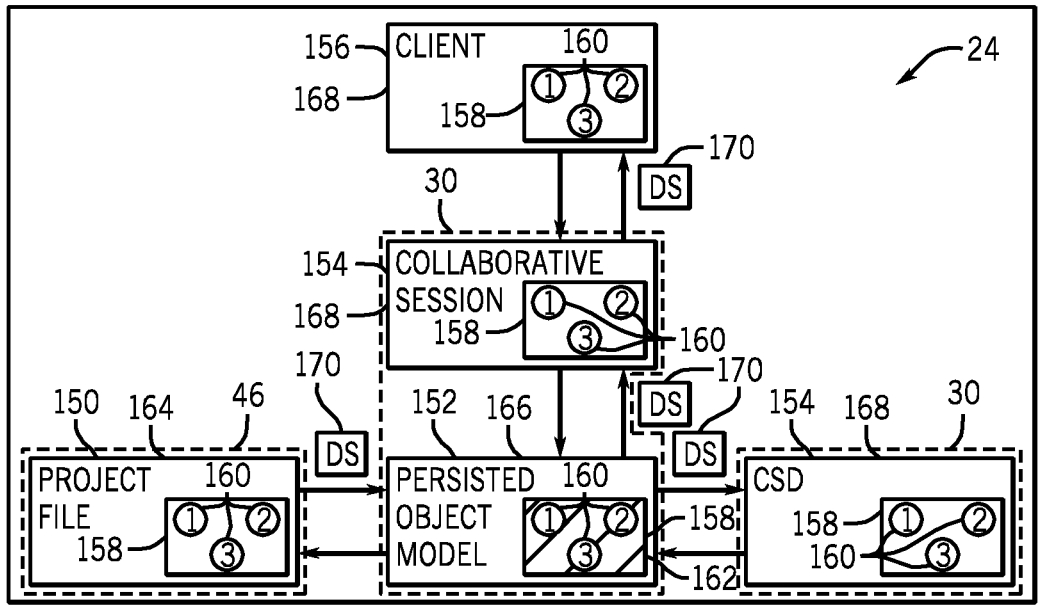
FIG. 5 is a diagram of the control and monitoring system of FIG. 1, illustrating the use of a persisted object model for communicating state change, in accordance with an embodiment.

Having now discussed the use of the state deltas 24, FIG. 5 illustrates an control and monitoring system 24 that includes a persisted object model for communicating state changes between components of the control and monitoring system 24. For example, the components may include the control/monitoring device 30 (e.g., a PLC), a programming terminal 46 providing a project file 150, and a component, such as a control/monitoring device 30 hosting the persisted object model 152 and a collaborative session 154, and a client 156. As previously discussed, the control/monitoring device 30 may be adapted to interface with components of a process 28 (FIG. 1). The project file 150 may be a computer file output representing various attributes of the control and monitoring system 24 defined and stored in a memory (e.g., hard drive) of the programming terminal 46 (FIG. 1). The persisted object model 152 may be a computer model of state data of one or more components in the control and monitoring system 24 that keeps track of changes made to the state data in the control and monitoring system 24 in a persistent fashion (e.g., by storing the state data on a non-volatile storage medium such as a hard drive). The persisted object model 152 may function as the change communication authority, such that all committed changes made to the state of an object are stored and communicated through the persisted object model 152. As will be discussed in more detail below, the collaborative session 154 may be an interactive information exchange interface between components of the control and monitoring system 24 that provides an environment for making pending changes (e.g., some changes may only be applied and communicated to other components of the control and monitoring system 24 after a user chooses to commit the changes). The client 156 may be any other component of the control and monitoring system 24 that retains state information of objects in memory, such as a component that provides a presentation view of an object.

In the illustrated embodiment, each of the illustrated components (the control/monitoring device 30 providing collaborative session data 154, the programming terminal 46 providing an updated project file 150, the control/monitoring device 30 providing the persisted object model 152 and the collaborative session 154, and client 156) includes a data container 158 (e.g., a memory reserved for data). The data container 158 contains state elements 160 that define the state of one or more objects of the control and monitoring system 24. The state elements 160 may be defined in a data driven manner such that different technologies (e.g., C++, Java, and/or C#) may make use of the data represented by the state elements 160. As previously discussed, it may be desirable to efficiently synchronize the state information stored in the various components of the control and monitoring system 24. As one or more of the state elements 160 stored in the data containers 158 change, the data elements 160 stored in the other components may need to be synchronized.

As discussed above, the persisted object model 152 may be the designated authority in applying state changes among the various components in the control and monitoring system 24. The persisted object model 152 may include what is referred to as a golden copy 162 of the state information for one or more objects in its data container 158 (as is illustrated by the cross-hatching). The golden copy 162 includes a copy of the state information, which the control and monitoring system 24 always considers correct. In other words, the golden copy 162 is an authoritative copy of the state information. Each piece of state information has its own golden copy 162 which may or may not reside with the golden copies 162 of other pieces of state information within the control and monitoring system 24 (e.g., on the same computer system). When one or more state element changes are committed, the changed elements are provided to the golden copy 162 in the form of a delta script 170, which is updated based upon the state element changes. The state element changes are then provided from the golden copy, via the delta scripts 170, to the other components within the control and monitoring system 24.

To affect state change within the data containers 158, the components of the control and monitoring system 24 may play various roles. The roles may include an instrument of change 164, an arbiter of change 166, and an audience 168. The instrument of change 164 (e.g. a client providing a modified project file 150 via an editor in the current embodiment) sends a change request to the arbiter of change 166. The instrument of change 164 may verify the success of the change by receiving an asynchronous change response and/or an error response regarding the change request. The arbiter of change 166 (e.g., a server hosting the persisted object model 42) queues incoming changes, processes the changes by carrying out the requested changes, makes other side-effect changes based upon the request, or discards the change. The arbiter of change 166 may provide a change response to the instrument of change 164, publish a change notification to the audience 168 (e.g., a client 156 and/or control/monitoring device 30 involved in a collaborative session 154) when changes occur, and/or write the changes to the golden copy 162. The audience 168 receives the change notifications and uses the notifications to update their local copy of the state information stored in their data container 158.

As previously discussed, the programming technology used in the various components of the control and monitoring system 24 may not be uniform. For example, some components may utilize C++, while others may utilize C# or Java. Thus, the state deltas 43 of FIG. 1 provided between the instrument of change 164, the arbiter of change 166, and the audience 168 may be provided in a data-driven delta script 170 that is not dependent on a particular technology. The delta script 170 may describe the object state changes in the form of create, update, and/or delete (CRUD) data. Create data may include some or all of the data useful for creation of an object (e.g., for a rectangle, the spatial location, width, and height of the rectangle). Default values may be used for any data not provided with the create request. Update data may include data that has been updated in the object (e.g., for a rectangle graphic that has an updated spatial location, the update data may only include the new spatial location). The delete data may identify (e.g., describe an identifier of) the object state data that has been removed (e.g., for a rectangle that has been removed, the delete data may include a name of the rectangle to be deleted). In one example, if a change was created using the following C# pseudo code:

```
ChangeManager cm = new GetChangeManager( );
CreateChange c1 = Changes.Composite( ).
    Create("Rectangle").Under(model).Set("X", "10").Set("Y", "10").Set("Width", "100").Set("Height", "200").
    Create("Circle").Under(model).Set("X", "10").Set("Y", "10").Set("Radius", "100");
cm.Do(c1);
```

A data-driven delta script might be similar to the following pseudo XML example:

```
<Script>
    <Create type="com.rockwell.Rectangle", CreatorID="45:2331" parentID="92">
        <Setter property="X", value="10" />
        <Setter property="Y", value="10" />
        <Setter property="Width", value="100" />
        <Setter property="Height", value="200" />
    </Create>
    <Create type="com.rockwell.Circle", CreatorID="45:4281" parentID="67">
        <Setter property="X", value="10" />
        <Setter property="Y", value="10" />
        <Setter property="Radius", value="100" />
    </Create>
</Script>
```

In alternative embodiments, it may not be necessary to include CreatorID or parentID. However, these id's are provided in the current embodiment to illustrate additional data that may be included with the changes (e.g., an identity of the entity that made the change and/or a parent object under which the current object is created). Because the data-driven delta script 170 is agnostic or not dependent on a particular programming technology, the delta script 170 may be consumed by any of the other components of the control and monitoring system 24, regardless of the programming technology used.

As illustrated in the example above, in some embodiments, the delta scripts 170 may include more than one change. Thus, the delta scripts 170 provide a way to process an entire set of changes in an all or nothing approach. For example, as illustrated above, two sets of create data are contained within the delta script for visualization on a display, one set to create a rectangle image and one set to create a circle image. If creation of the circle image results in an error, the rectangle change may be undone, resulting in an all or nothing approach.

The delta scripts 170 may also include header information such as a change revision number, timestamp when the change was committed, an identifier of the user that made the change, and/or a unique revision identifier. The identifier of the user may be useful to authenticate the source of the change. Further, the delta scripts 170 include an identifier of the objects to which the change applies, the state elements 160 that have changed, and the change value of the state elements 160. A create data set may include an object's full state (e.g., all state elements 160), as it will be the first time each of the state elements 160 is introduced to the consumers of the delta scripts 170.

Figure 6:
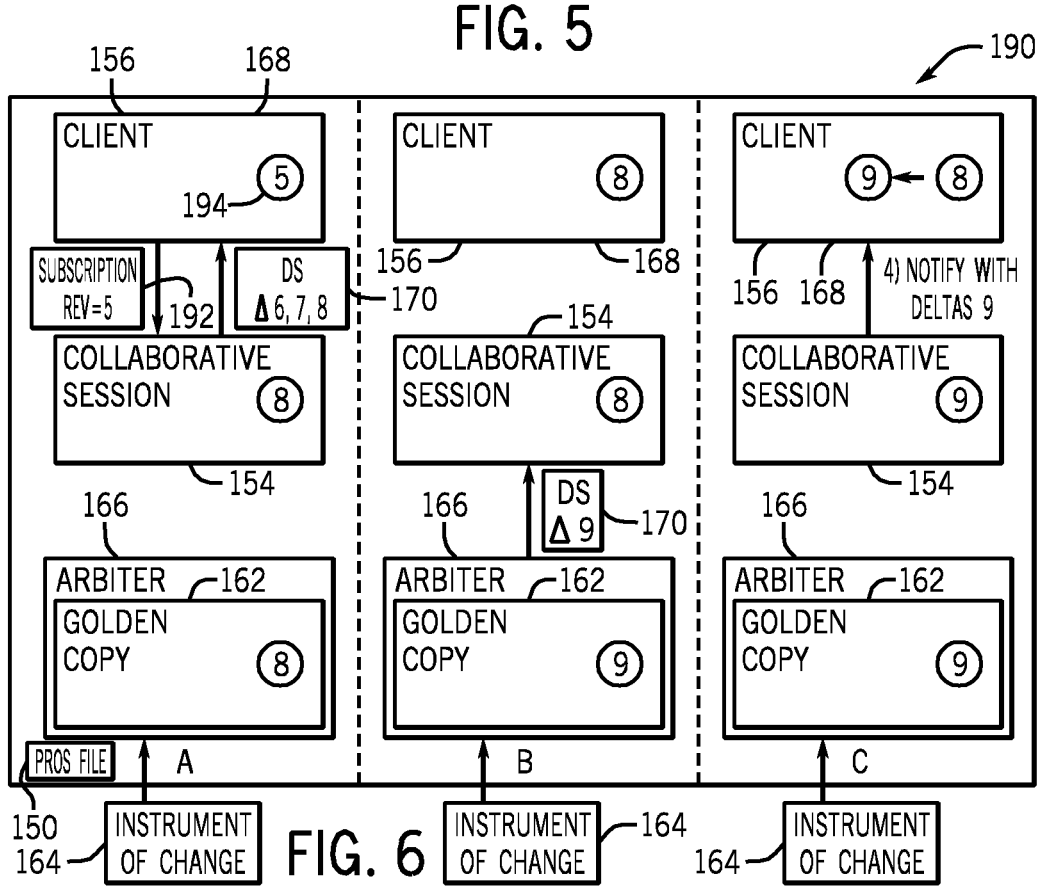
FIG. 6 illustrates a progression of state change communication between an instrument of change, an arbiter of change, and an audience member, in accordance with an embodiment.

Turning now to FIG. 6, the progression 190 of state change communication between an instrument of change 164, an arbiter of change 166, and an audience member 168 is illustrated. In the current embodiment, the audience 168 (e.g., client 156) provides a subscription request 192 to the collaborative session 154. The subscription request 192 may include a revision number for the revision 194 of the state information stored in the audience member 168. When the revision on the collaborative session 154 does not match the revision number sent in the subscription request 192, the collaborative session will send out immediate notification of updates with the set of delta scripts 170 needed to bring the audience member 168 up to the revision stored in the collaborative session 154. For example, in panel A, the client 156 sends a subscription request 192 that includes revision 5. The collaborative session 154 is on revision 8, and thus sends delta scripts 170 for revisions 6, 7, and 8 to the client 156. The client 156 may apply the delta scripts 170 to its state and thus, as illustrated in panel B, the client is updated to revision 8.

When an instrument of change 164 (e.g., a client or server that provides an updated program file 150) updates the golden copy 162, the collaborative session 154 and the subscribing audience members (e.g., client 156) should be notified of the change. As illustrated in panel B, upon update of the golden copy 162 from revision 8 to revision 9 (e.g., via a change orchestrated by sending an updated project file 150 from the instrument of change 164), the arbiter of change 166 provides a delta script 170 for revision 9 to the collaborative session 154. As illustrated in panel C, the collaborative session 154 applies the delta script 170 for revision 9 and, thus, is updated to revision 9. The delta script 170 is then propagated to the audience member 168 (e.g., the client 156). The client 156 applies the delta script 170 and is updated to revision 9.

In certain scenarios, an audience member may need more delta scripts 170 than are stored in the collaborative session 154. For example, if client 156 were to send a subscription request 192 while on revision 2, and the collaborative session 154 only had the delta scripts 170 for revisions 5-8, client 156 would still need the delta scripts 170 for revisions 3 and 4. When the collaborative session 154 is lacking necessary delta scripts 170, it may request that the golden copy 162 provide the needed delta scripts 170. In some embodiments, the golden copy 162 will store all delta scripts for each revision of an object's state information. However, in other embodiments, only a limited number of scripts will be stored (e.g., the last 5, 10, 50, or 100 revisions of delta scripts 170). If the golden copy 162 can provide the necessary scripts, they are propagated through the collaborative session 154 to the client 156. However, if the necessary delta scripts cannot be propagated, the audience member 168 may be notified (e.g., via an exception message) and/or the audience member 168 may be reloaded with the entire set of elements associated with the current state information, bringing the audience member 168 up to date. Further, if the audience member 168 encounters errors applying one or more of the delta scripts 170, the audience member 168 may be reloaded with the entire set of elements associated with the current state information. Additionally, in certain situations, when there are a large number of delta scripts 170 that would need to be applied in order to update the audience member 168, it may be more efficient or desirable to fully reload all of the state information, rather than applying the state deltas. In certain embodiments, the audience member 168 may be reloaded with the entire set of elements associated with the current state information when the number of delta scripts that would need to be applied is over a maximum delta script threshold. The maximum delta script threshold may be customized based upon a perceived number of delta scripts that would tend to make a full reload of state information more efficient than loading incremental delta scripts.

In certain embodiments, the control and monitoring system 24 may also include reverse deltas. Reverse deltas describe the changes necessary to change from a current revision back to the previous revision. When applied, the reverse delta scripts will take an object's state information back one revision. Such reverse delta scripts are applied to data containers (e.g., data containers 158 of FIG. 5) that contain the same revision number as the reverse delta script. Reverse delta scripts may be useful to create "undo" functionality for changes committed in the control and monitoring system 24 and may also be used to back out pending changes that have not yet been committed, such as those created in the collaborative session 154 prior to committing the changes.

Figure 7:
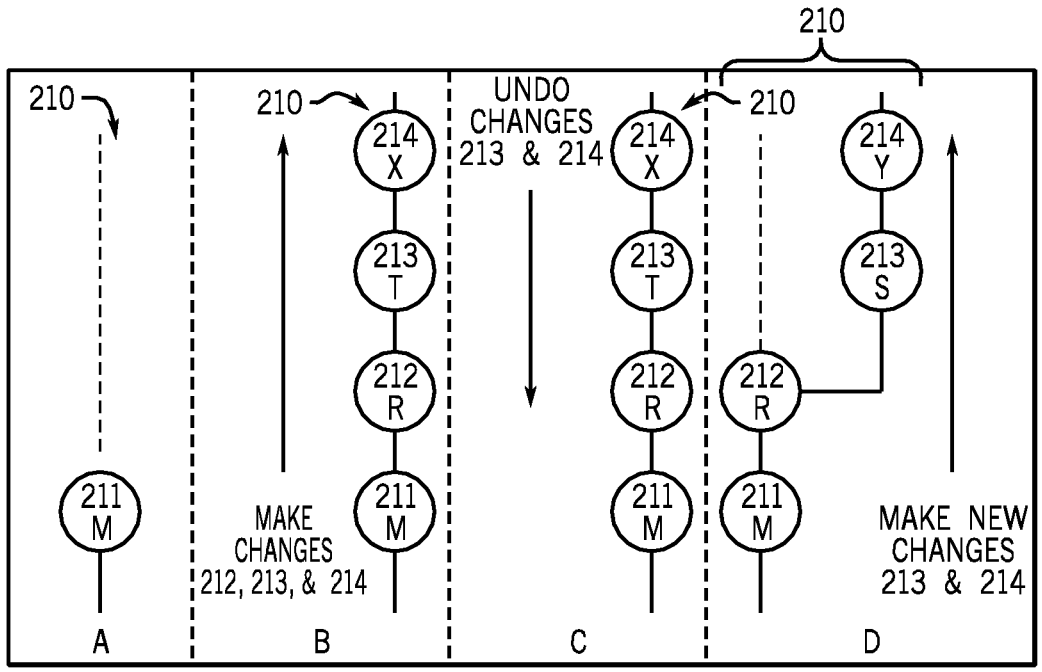
FIG. 7 illustrates a process where state changes are undone, in accordance with an embodiment.

FIG. 7 illustrates one undo scenario, in accordance with an embodiment. In panel A, an edit session for revision 211 of an object 210 is initiated by a first client. Edits are made within the session, by the first client, to bring the object 210 to pending revision 214 in panel B. The first client disconnects, and while disconnected, a second client undoes revisions 214 and 213, as illustrated in panel C. The second client then makes new changes 213 and 214.

To prevent the first client from detecting that it is up to date when just based upon revision number, each revision will be assigned an identifier, such that the combination of the revision number and the identifier creates a unique identifier for the revision number. When reverse delta scripts are applied to undo a change, the undone delta scripts may be retained, such that "redo" functionality may be implemented. When changes are redone, the previous identifier for the revision is reused because the delta script is reintroducing the same change that was previously removed. However, when a new revision is made, a new revision identifier is used, such that no component of the control and monitoring system 24 confuses the undone revision with the new revision with the same number.

For example, each of the revisions in FIG. 7 have an associated identifier. Revision 211 has an identifier of M, 212 has an identifier of R, the original revision 213 has an identifier of T and the original revision 214 has an identifier of X. When revisions 214 and 213 are undone, they are removed from the pending revisions. If they are "redone," they are re-added to the pending changes, regenerating revisions with the same identifiers T and X. However, in the current example, new changes are made, creating new revisions 213 and 214 with identifiers S and Y, respectively. Because they are completely new revisions, new identifiers S and Y are used to identify the revisions. Once the first client comes back online and re-subscribes for updates, there will be no doubt that it is not currently up to date because its final revision is 214-X and the current revision is 214-Y. In some embodiments, the first client may be updated by tracing the revision numbers and identifiers to find the edit path and update the revision information accordingly. In other embodiments, when inconsistent revision number identifiers are found, the component may be reloaded with the entire set of state information (e.g., all of the state elements 160).

Figure 8:
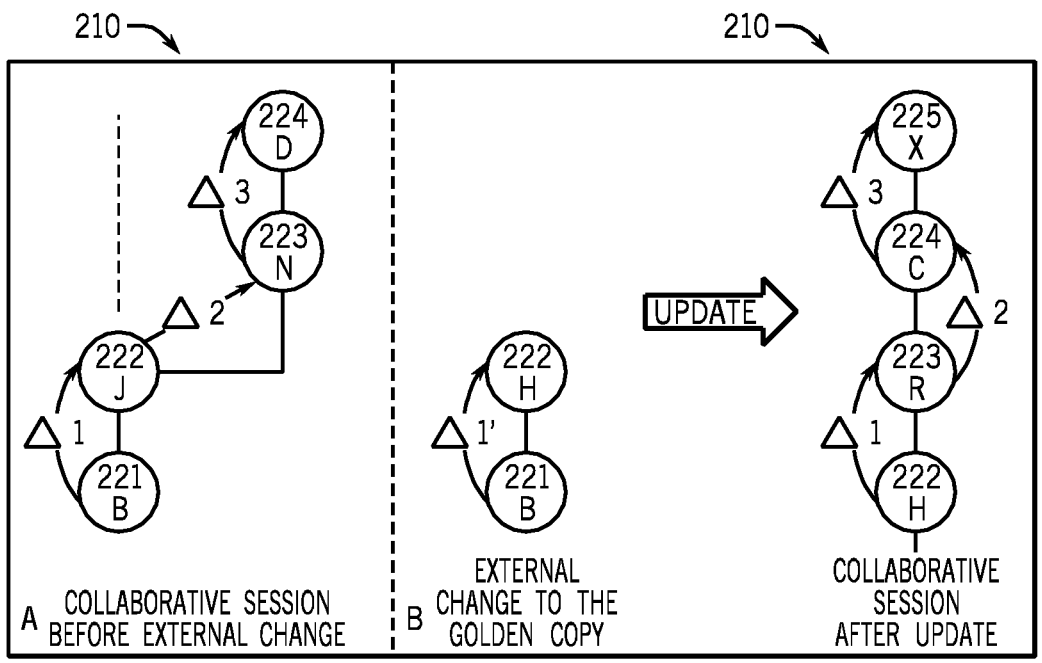
FIG. 8 illustrates a process where external changes are made during a pending edit, in accordance with an embodiment.

Changes may be made to the golden copy (e.g., golden copy 162 of FIG. 6) outside of the collaborative session (e.g., collaborative session 154 of FIG. 6) where pending edits are being made. FIG. 8 illustrates a scenario where external changes to the golden copy 162 are made while pending edits are currently being made in the collaborative session 154. As illustrated, a first pending change Δ 1 is applied to revision 221-B of object 210 generating revision 222-J. Additionally, second and third pending changes Δ 2 and Δ 3 are applied to generate revisions 223-N and 224-D, respectively. Before the pending changes Δ 1, Δ 2, and Δ 3 are committed, an external change Δ 1' is applied by another component of the control and monitoring system 24 to the golden copy 162, which is currently on revision 221-B. When the collaborative session 154 receives notification that a new revision 222 exists, it backs out pending changes Δ 3, Δ 2, and Δ 1 (holding them as forward deltas to be processed in the future). The collaborative session then applies the delta script for revision 222-H, and then reapplies pending changes Δ 1, Δ 2, and Δ 3, which create revisions 223-R, 224-C, and 225-X, respectively. In some cases, pending changes Δ 1, Δ 2, and Δ 3 may be modified in order to be applied after revision 222-H. In some embodiments, the audience member making pending changes in the collaborative session 154 may be notified that the pending changes are being applied over a recent external change to the golden copy 162.

Figure 9:
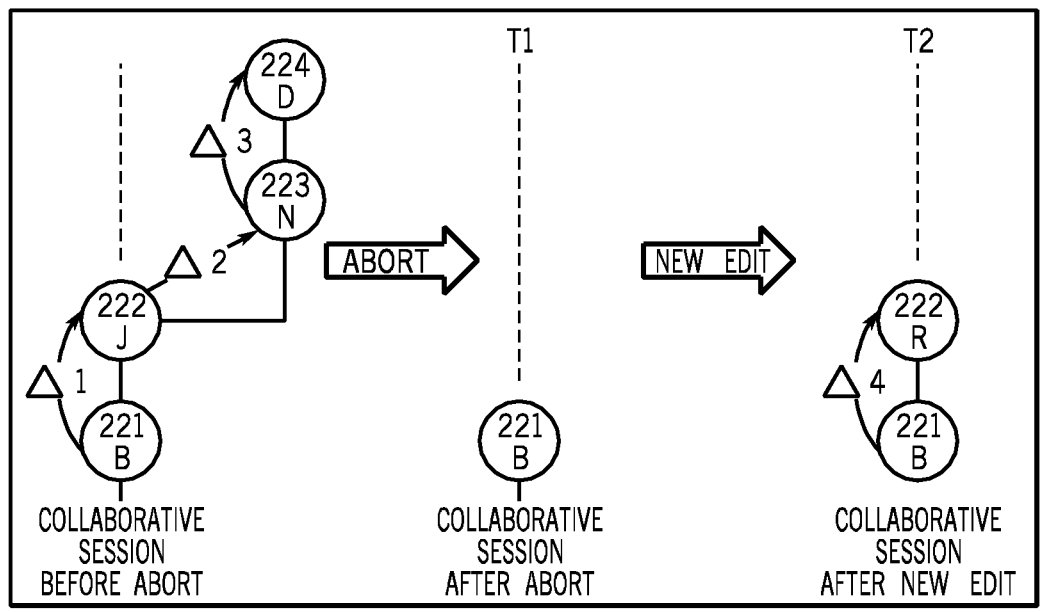
FIG. 9 illustrates a process for aborting pending changes, in accordance with an embodiment.

In certain situations, a user may desire to abort pending changes made in a collaborative session 154. FIG. 9 illustrates a process for aborting pending revisions in a collaborative session 154. As illustrated in the current example, a user creates pending changes Δ 1 off of revision 221-B, generating revision 222-J. A pending change Δ 2 is created off of revision 222-J, generating revision 223-N. Further, pending change Δ 3 is created off of state 223-N, generating revision 224-D. The user may determine that the changes are not necessary and/or undesirable and may cancel the changes (e.g., by selecting a cancel button in the programming terminal 46 of FIG. 2). To back out the pending changes, components with pending state changes may apply reverse deltas for each of the pending changes (e.g., Δ 3, Δ 2, and Δ 1) such that the original non-pending revision (e.g., revision 51-B) remains. Alternatively, the components may simply reload the full state information from the golden copy 162, because the golden copy 162 has the latest non-pending revision stored (e.g., the revision that does not include the changes that are to be aborted). Thus, as illustrated in FIG. 9, through reverse deltas or reloading from the golden copy 162, the collaborative session is left with revision 221-B at time T1. Thus, the collaborative session is available to take on additional edits (e.g. A 4) off of revision 221-B, generating a new revision 222-R at time T2.

Figure 10:
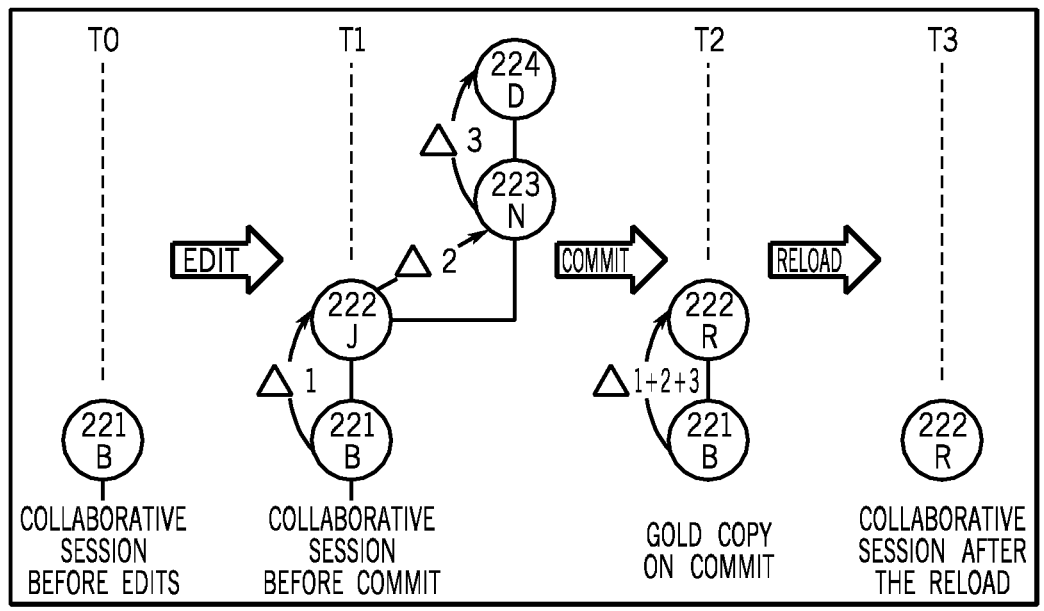
FIG. 10 illustrates a process for compressing pending changes into one set of changes, in accordance with an embodiment.

In certain situations, it may be beneficial to compress multiple pending changes into one revision rather than creating separate revisions for each of the pending changes. FIG. 10 illustrates an embodiment where some of the pending changes are combined into one set of edits, such that fewer revisions are generated. As illustrated, at time T0 an edit session is opened. Pending changes are applied to the revision 221-B, generating revisions 222-J, 223-N, and 224-D. The pending changes may relate to changes made to a common state element (e.g., each change may modify the spatial location of a rectangle on a display). For example, revision 222-J may place the rectangle in the center of the screen, revision 223-N may update the rectangle location to the upper left hand corner of the screen, and revision 224-D may update the location to the bottom left hand corner of the screen. Thus, while several value changes have been applied, only the delta from the original (e.g., revision 221-B) to the final value (e.g., bottom left hand corner placement on the screen as described in revision 224-D) may be needed. Therefore, the intermediate revisions in the collaborative session 154 may be collapsed into a single revision on the golden copy 162. Thus, as shown at T2, pending changes Δ 1, Δ 2, and Δ 3 are compressed and applied to revision 221-B, resulting in revision 222-R. In embodiments where components are configured to fully reload all state information upon detecting a conflicting identifier associated with a revision number, the components may reload all state information for revision 222-R upon being notified that revision 222-R is available (as illustrated at T3). As one of ordinary skill in the art would appreciate, this is merely one form of compression that may be applied to combine deltas. The provided example is not intended to limit the techniques of compression for the pending changes.

Distributed Command Execution

Figure 11:
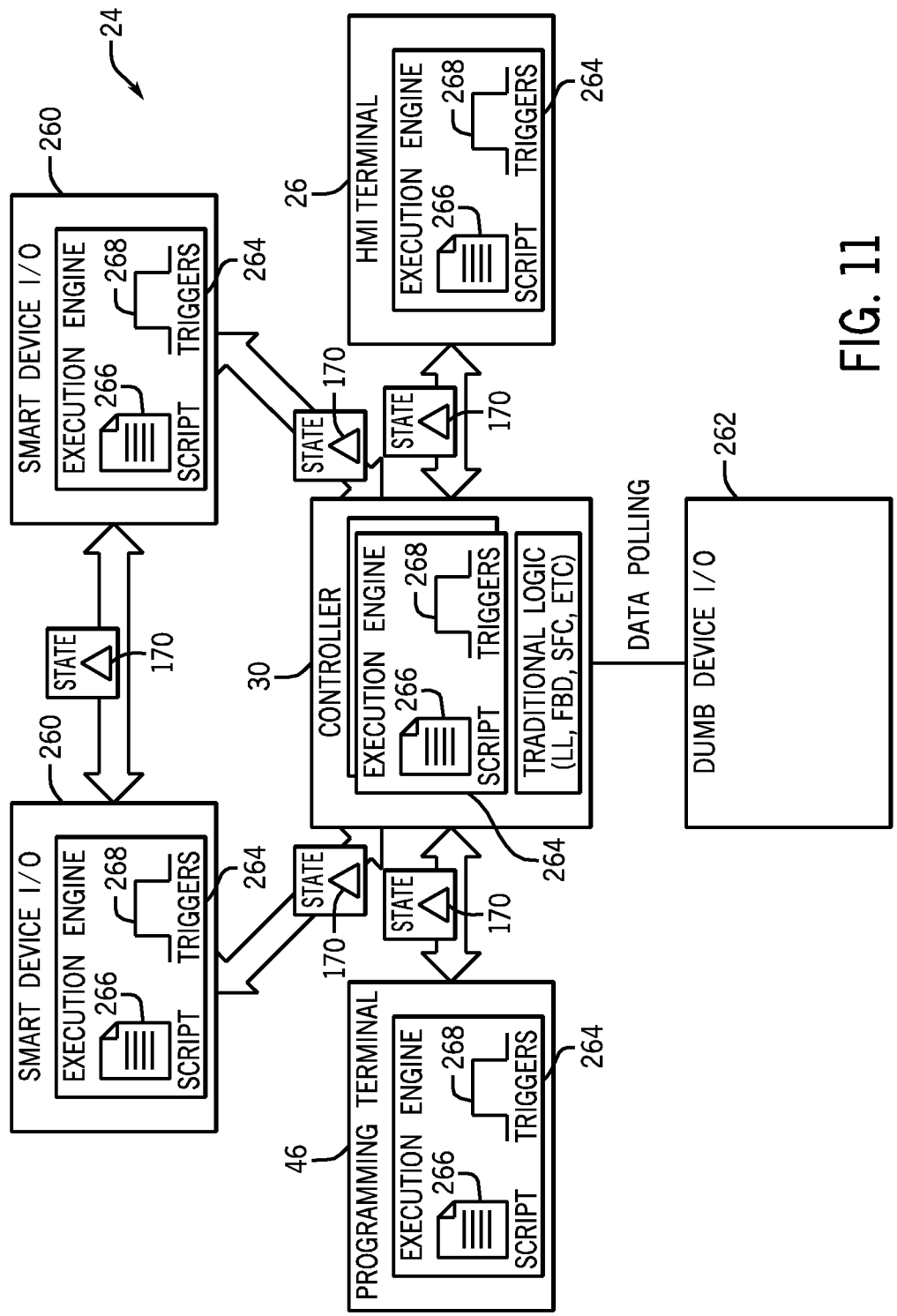
FIG. 11 illustrates an automation control and monitoring system that uses distributed execution engines to execute control commands, in accordance with an embodiment.

Turning now to a discussion of how changes are applied within the control and monitoring system 24 once they are communicated, FIG. 11 illustrates a control and monitoring system 24 with a variety of components (e.g., HMI terminal 26, control/monitoring device 30, programming terminal 46, smart input/output devices 260, and dumb input/output (I/O) devices 262). The smart I/O devices 260 may include a central processing unit (CPU), such that the smart I/O devices 260 may execute logic based upon data provided to them. The dumb I/O devices 262 may not include a CPU, and thus may rely upon a controller to apply logic to their inputs.

Execution engines 264 may be embedded within various components of the control and monitoring system 24 that can support them. In one example, components with CPUs are embedded with the execution engines 264. The execution engines 264 enable changes in the control and monitoring system 24 (e.g., state deltas 43) to be applied to the various components with embedded execution engines 264. The execution engines 264 contain commands (e.g., command scripts 266) and trigger conditions 268. The command scripts 266 are executed by the execution engine 264 upon a trigger condition 268 evaluating to true. For example, a trigger condition 268 may evaluate to true when there is a change in state of a smart I/O device 260 or dumb I/O device 262, a change in value of data in the control/monitoring device 30 (e.g., produced by the delta scripts 170), and/or when a user interacts with the HMI 26. By distributing execution engines 264 throughout various components of the control and monitoring system 24, control and monitoring system 24 changes may be more effectively handled. For example, the processing power of CPUs of the various components may be utilized to perform control logic needed for the components of the control and monitoring system 24. Further, execution of the commands on the various components of the control and monitoring system 24 may increase redundancy and/or provide better places to execute the commands than a centralized controller. For example, a smart I/O device 260 is enabled to execute logic specific to the smart I/O device 260 in response to changes of the control and monitoring system 24, without relying on the control/monitoring device 30.

As discussed above, some components (e.g., dumb I/O device 262) may not be able to support an embedded execution engine 264 or may support an execution engine 264 but not have one embedded. These components may rely on other components (e.g., control/monitoring device 30) to execute logic for the components that do not have an embedded execution engine 84. For example, as illustrated in FIG. 11, the dumb I/O device 262 does not have an embedded execution engine 264. Instead, data is polled using traditional logic of the control/monitoring device 30 (e.g., Ladder Logic (LL), Function Block Diagrams (FBD), Sequential Function Charts (SFC), etc.).

The commands (e.g., command scripts 266, such as user and/or system defined relay ladder logic) may be computer-readable instructions (e.g., objects) stored on a tangible, non-transitory, computer-readable medium (e.g., a harddrive, a database, read-only memory, and/or random access memory) to be executed upon a trigger condition or at a scheduled time. For example, the commands may be stored in the data containers 158 of FIG. 5. The commands may inherit properties and/or a base set of functionality from a command base class. Specific properties and behaviors may be added to the base class, to derive other command classes, such as classes for screen navigation and writing tag values, etc. In certain embodiments, the command base class may include parameters, or a collection of parameter data name/value pairs that may be used for inputs and outputs. Further, the command base class may include a "done" property that indicates that a command has finished execution. The command base class may include an error property that indicates that a command execution has stopped due to an error. Further, the command base class may include a parent property that is used by the control and monitoring system 24 to determine who is responsible for memory clean up of the command (e.g., what entity should delete the command from the data containers 158 after execution). The command base class may include a name property that identifies the command. The name property may be used in expressions and trigger conditions 268, such that properties of the command may trigger additional commands. The command base class may include a progress property that indicates the progress of execution of the command and may also have a timed out property that indicates that execution of a command has timed out (e.g., has not executed within an allotted time period). The command base class may include a schedule property that adds the command to an appropriate thread of execution, which will be discussed in more detail below. Further, the command base class may include an execute property that include execution instructions.

In certain embodiments, the commands may be composited, or brought together. There are two basic forms of compositing: sequential command compositing and parallel command compositing. In sequential command composites, each command brought together in the group are executed one at a time, in a given order. One example of a useful sequential command composite may be a set of commands to 1) write a tag to start a tank filling, 2) wait for a specific tag value, and 3) change the state of a graphical element. The following is a pseudocode example of a possible sequential command composite:

```
<Sequence>
    <WriteTag ref="mytank" ... >
    <WaitFor trigger="mytank.fill==100" ... >
    <SetState ref="myTankDoneText" state="Done" />
</Sequence>
```

In parallel command composites, each command brought together in the composite is executed at the same time. For example, the write tag commands below may be executed at the same start time:

```
<Parallel>
    <WriteTag ref='valve_inlet.close' value='true' />
    <WriteTag ref='valve_outlet.open' value='true' />
</Parallel>
```

In certain embodiments, the command composites may include a combination of sequential and parallel composites. For example:

```
<Parallel>
    <WriteTag name="cmd1" />
    <WriteTag name="cmd2" />
    <Sequence>
        <WaitFor trigger="cmd1.done && cmd2.done">
        <SetState ... />
    </Sequence>
</Parallel>
```

Figure 12:
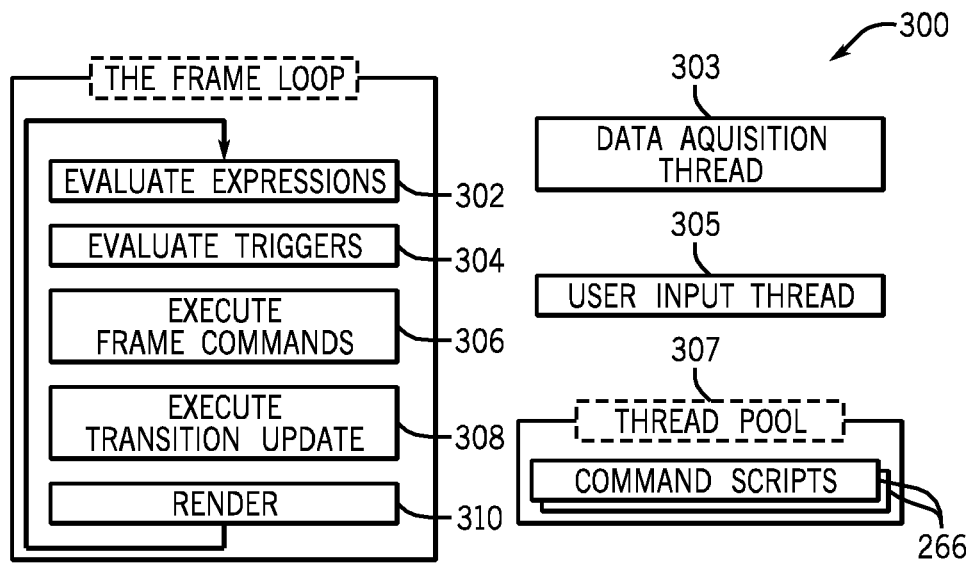
FIG. 12 illustrates a process loop executed through the execution engines, in accordance with an embodiment.

Turning now to FIG. 12, an embodiment of a frame loop 300, executed through the execution engines, is provided. The frame loop 300 is a set of computer-readable instructions that run for controlled periods of time (e.g., 30 times per second). The goal of the frame loop 300 is to react to data changes (e.g., state deltas 43) provided to the execution engines 264 of FIG. 11. As illustrated, the frame loop 300 may evaluate expressions at block 302. For example, expression data (e.g., values of data objects) are provided via a data acquisition thread 303, which accesses state data of the control and monitoring system 24. The frame loop evaluates trigger conditions (e.g., trigger conditions 268 of FIG. 11) at block 304 based upon the evaluated expressions. If any of the trigger conditions 268 evaluate to true based upon the evaluated expressions, the commands (e.g., command scripts 266 of FIG. 11) associated with the trigger conditions 268 may be scheduled or executed. As will be discussed in more detail below, with regards to FIG. 13, certain commands may be executed within the frame loop 300 and others may be scheduled and executed in other threads or thread pools (e.g., user input thread 305 and thread pool 307). The frame commands, or commands that are scheduled to run in the frame loop 300, are executed at block 306. Next, any transition updates (e.g., a computer-readable instruction of how to change from one value to another) are executed at block 308. One example of a transition update may include a graphical animation to signify a change in state, such as animated arrows illustrating a flow for an open valve, or a fade out for a recent state change that is graphically-represented. The frame loop 300 may then render the changes applied by the executed commands (e.g., rendering an updated screen image and/or new data values).

As discussed above, the frame loop 300 may be run for controlled periods of time (e.g., 30 time per second). In some embodiments, frame loop 300 performance may be tuned by skipping a portion of the frame loop 100 at given time intervals. For example, assuming that the frame loop 300 runs 30 times per second, the frame loop 300 may be designed to run expression evaluation (block 102) every third frame, the triggers may be evaluated (block 304) at every third frame, starting with the second frame, and the transition updates (block 308) may be rendered every third frame starting with the third frame. The rendering (block 310) may continue to execute at every frame, or may be optimized run only when changes have occurred. Thus, each of the blocks may still be executed in order, but throttled to execute with less frequency (e.g., one-third the frequency or 10 frames per second).

Further, the frame rate may be modified based upon the hardware running the execution engine 264. For example, in some embodiments, when lower power processors are utilized such as ARM® based systems, the frame loop may run at 12 frames per second, when an atom based system is used, the frame loop may execute 30 frames per second, when a desktop is used, the frame loop may execute 60 frames per second, and when a browser based system is used, the frame loop may execute 24 frames per second. Further, transition options may allow fewer transitions (e.g., 1 for every 6 frames) and/or may allow transitions to render less often (e.g., not every frame) depending on the platform that is used. The execution engine 264 may also adapt to tune the frame loop 300 during runtime based on the determined execution times of the various stages of the frame loop 300. For example, expression heavy screens may need more expression evaluation time and transition heavy screens may need more transition processing/execution time.

Figure 13:
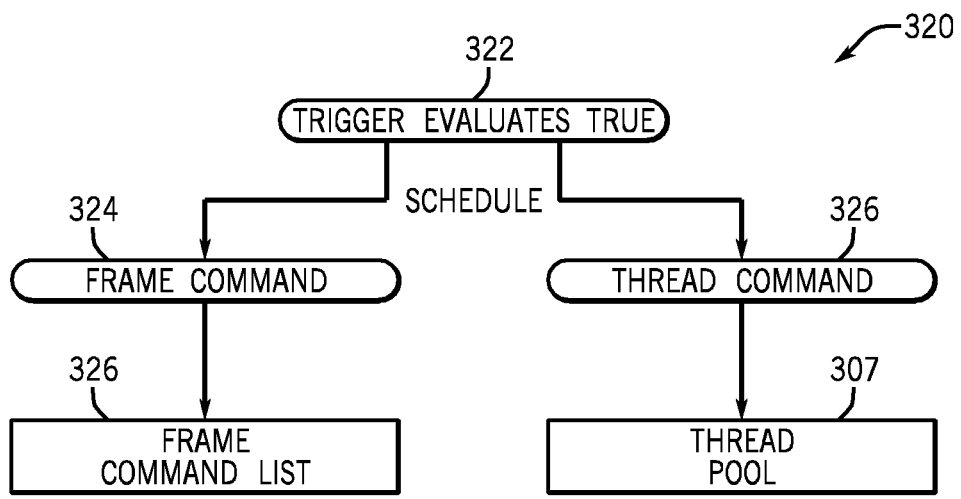
FIG. 13 illustrates a process for scheduling commands, in accordance with an embodiment.

Turning now to a discussion of how commands are scheduled to execute, FIG. 13 illustrates a process 320 for scheduling commands, in accordance with an embodiment. The scheduling process 320 begins when a trigger condition 268 evaluates to true at block 322. As previously discussed, there may be one or more commands associated with the trigger condition 268. Depending on the type of commands that are associated with the trigger condition 268, the process 320 may take one of two paths. The commands may be either a frame command 324 or a thread command 326. Frame commands 324 affect data on the main frame loop 300. To be executed on the main frame loop 300, the frame commands 324 may be added to a frame command list 326. The frame commands 324 may then be executed on the main frame loop 300 (block 306 of FIG. 12). Typically, these commands change data that necessitates a re-rendering of data. Thus, these commands may be executed prior to rendering (block 310 of FIG. 12).

Thread commands 326, are commands that do not access data in the memory space of the frame loop 300 execution. These commands are free to be scheduled on a different thread than the frame loop 300. Thus, when a trigger condition 268 evaluates to true for a thread command 326, the thread command is scheduled to run in a thread pool 307. By utilizing the thread pool 307, more efficient use of resources may be obtained. For example, by keeping thread commands 326 off of the frame loop 300 thread, the frame loop 300 is free to execute the more important commands and/or the commands that must be run on the frame loop 300.

Chainable Plug-in Architecture

Having now discussed change communication and command execution within the control and monitoring system 27, a discussion of data transformation through chainable plug-in functionality follows. As discussed above, the control and monitoring system 27 may be a data-driven system with numerous types of resources that may be communicated between components of the system 27. Resource types are data classifications that identify what a resource is. Examples of such resource types may be tags, object data types, visualization screens, or any other user-definable object in the system 27. These resources may inherit functionality between one another, creating a highly dynamic typed system. In other words, many resource types with different levels of granularity may exist within the system.

From time to time, modifications to components of the control and monitoring system 27 may be desired. For example, a manufacturer of design and/or control software or a user of the control and monitoring system 27 may desire to transform one type of data (or event associated with the data) into another type of data or event. These modifications may be added to the underlying machine-readable instructions defining the control and monitoring system 27, however such modifications would likely require recompilation of the machine-readable instructions. Accordingly, components of the control and monitoring system 27 may enable plug-ins to be generated that may handle the various resource types in the system 27. Plug-ins are machine-readable code, separate from an application's machine-readable code, that enables customizable or increased functionality of the application. FIG. 14 provides an illustration of one such system, in accordance with an embodiment.

Similar to FIG. 1, the system 350 of FIG. 14 includes a controller 30, which is representative of a control and/or monitoring device. In operation, the controller 30 monitors and controls a process 28 via sensors 34 and actuators 36. Further, the system 350 includes an HMI 26 that includes services 352 for enabling a human to monitor and/or control various processes within the system 350. A programming terminal 46 in the system 350 may enable one or more users to configure attributes of the HMI 26 and/or controllers 30.

As discussed above, there are many instances where it may be desirable to add additional functionality to the system 350. For example, a user of the system 350 may wish to enable customized machine-implemented instructions that are not available in the HMI 26 and/or the programming terminal 46. Additionally, the manufacturer of the HMI 26 and/or the programming terminal 46 may desire to implement a new feature without rebuilding the complete set of machine-readable instructions defining these components of the system 350. Accordingly, components (e.g., the HMI 26 and/or the programming terminal 46) may include machine-readable instructions for handling plug-ins, which may be defined as portions of machine-readable code external to the instructions defining the HMI 26 and/or the programming terminal 46. These plug-ins may make it possible to modify functionalities of the components without requiring a restart of the components.

As illustrated in the FIG. 14, the HMI 26 and programming terminal 46 are equipped with plug-in management systems 354 and 356, respectively. These plug-in management systems 354 and 356 may enable the HMI 26 and the programming terminal 46 to register plug-ins 358 and 360, respectively. By registering the plug-ins 358 and 360, the HMI 26 and programming terminal 46 may become aware of and implement the plug-in functionality. For example, the plug-in 358 may include external security logic to be used in the HMI 26. A user or the HMI 26 manufacturer may create the plug-in 358 and register it with the HMI 26 via the plug-in management system 354.

Upon registration with the HMI 26 and/or the programming terminal 46, the plug-ins 358 and 360 may access services 352 and 355 of the components they are registered with. For example, the HMI plug-in 358 may access services 352 of the HMI 26 via a service interface 364. The programming terminal plug-in 360 may access services 355 of the programming terminal 46 via the service interface 366. In one embodiment, the interfaces 364 and 366 may be application programming interfaces (APIs) that may receive interaction instructions from the plug-ins 358 and 360.

As discussed above, resources 362 may be communicated between components of the system 350. The resources 362 may be objects created in a polymorphic chain. Polymorphism relates to the ability of objects to have a common interface (e.g., of functions), despite being of different types. Additionally, a polymorphic chain may infer that resources of different types are derived from one another. In a simple example, resources 362 with the type of shape, rectangle, and square may be present in the system 350. The rectangle type may be derived from the shape type and the square type may be derived from the rectangle type. Further, these resources 362 may be defined by a generalized object model, or a model that does not distinguish a recipient from other request parameters. Because these resource types are defined by a generalized object model, the data access and transformation of the resources 362 may be generalized, not requiring the transformation recipient to be distinguished from the other parameters associated with the resources 362. Accordingly, the plug-in management systems 354 and 356 may be enabled to access and use data anywhere in a polymorphic chain. For example, a plug-in to adjust the size of a resource 362 may be used to adjust the size of a rectangle and square as well. This may occur through a series of plug-ins that can chain together to handle a particular resource type. For example, the plug-in management systems 354 and/or 356 may determine a proper subset of chainable plug-ins to handle a particular resource 362 based upon the generalized object model path that defines the resource 362. In certain embodiments, the plug-ins may specify particular types of resource that they handle. The plug-in management systems 354 and/or 356 may determine the proper chain (e.g., the proper set of plug-ins and the proper order) needed to implement functionality.

The number of features that may be implemented through the chainable plug-ins is quite vast. Because the plug-ins are chainable, features for virtually all resource types present in the system 350 may be generated, regardless of what point in the polymorphic chain that the resource types may be found. Further, plug-ins may be designed to add functionalities prior to, during, and/or after creation and/or deletion of the resource. Accordingly, a very dynamic set of plug-ins that are capable of handling many resource types may be possible.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An automation control system, comprising:
one or more components comprising a plug-in management system configured to handle chainable plug-ins corresponding to the one or more components, by:
registering one or more chainable plug-ins with each of the respective one or more components,
determining particular plug-in resource types handled by a plurality of available chainable plug-ins from the registered one or more chainable plug-ins;
determining a proper chain of two or more of the plurality of available chainable plug-ins from the registered one or more chainable plug-ins that, when chained, implement functionality of one chainable plug-in via a resource type of a different chainable plug-in, wherein the proper chain comprises a proper order of the two or more of the plurality of available chainable plug-ins that implements the functionality for the resource type;
wherein the functionality includes transforming data, generating events or both in the automation control system;
wherein the chainable plug-ins are chained based on the resource data, the events, or both, and based upon resource types handled by the chainable plug-ins;
wherein the chainable plug-ins comprise at least one polymorphic chainable plug-in, the polymorphic chainable plug-in comprising a common interface capable of handling a plurality of resource types defined by a polymorphic chain; and
wherein the proper chain comprises the at least one polymorphic chainable plug-in, making use of the common interface using one of the plurality of resource types defined by the polymorphic chain.

2. The automation control system of claim 1, wherein the one or more components comprises a human machine interface (HMI).

3. The automation control system of claim 2, wherein the one or more components comprises a programming terminal.

4. The automation control system of claim 1, wherein the resource type comprises at least one of a control program, a tag, a data type, a module configuration, or an HMI screen.

5. The automation control system of claim 1, wherein the plug-in management system is configured to apply the chainable plug-ins without requiring a restart of the one or more components.

6. The automation control system of claim 1, wherein the resource type is defined according to a generalized object model.

7. The automation control system of claim 6, wherein the plug-in management system is configured to determine a proper subset of chainable plug-ins needed to handle the resource type based upon the generalized object model.

8. The automation control system of claim 1, wherein the plug-in management system is configured to register the chainable plug-ins.

9. The automation control system of claim 1, wherein the chainable plug-ins are configured to access one or more services of the one or more components via a services interface.

10. The automation control system of claim 9, wherein the services interface comprises an application programming interface (API).

11. A chainable plug-in for a component of an automation control and monitoring system, stored on a tangible, non-transitory, machine-readable medium, comprising:
machine-readable code comprising instructions to;
register the chainable plug-in with the component;

access services of the component of the automation control and monitoring system;

obtain resource data or events from the services;

transform data, generate events, or both in the automation control and monitoring system; and chain the chainable plug-in with other chainable plug-ins in a proper order, based on the data, the events, or both, and based upon resource types handled by the chainable plug-in and resource types handled by the other chainable plug-ins, such that additional resource types, comprising the resource types handled by the other chainable plug-ins, are handled by the chainable plug-in, resulting in a chain of two or more chainable plug-ins;

wherein the additional resource types are defined by the proper order of the two or more chainable plug-ins of the chain; and at least one of the chainable plug-in or one of the other chainable plug-ins comprises a polymorphic plug-in, the polymorphic plug-in comprising a common interface capable of handling a plurality of resource types.

12. The chainable plug-in of claim 11, wherein the plug-in comprises machine-readable instructions created by a manufacturer of the component.

13. The chainable plug-in of claim 11, wherein the plug-in comprises machine-readable instructions created by a user of the component.

14. The chainable plug-in of claim 11, wherein the instructions to chain comprise instructions to chain based upon a generalized object model defining the resource data or events.

15. The chainable plug-in of claim 11, comprising instructions to:

transform the data, generate the events, or both before a resource is created, while a resource is being created, or after a resource has been created.

16. The chainable plug-in of claim 11, comprising instructions to:

transform the data, generate the events, or both before a resource is deleted, while a resource is being deleted, or after a resource has been deleted.

17. A method for modifying functionality of a component of an automation monitoring and control system, comprising:

determining particular plug-in resource types that a plurality of available chainable plug-ins handle;

registering a chainable plug-in with the component, the chainable plug-in comprising a polymorphic chainable plug-in comprising a common interface capable of handling a plurality of resource types;

providing resource data or events to the chainable plug-in, the resource data or events conforming to one of the plurality of resource types; and transforming the resource data or generating additional events based upon the chainable plug-in;

wherein the chainable plug-in is chained, in a proper order, to other chainable plug-ins to transform the resource data or generate the additional events, such that additional resource types other than a resource type of the chainable plug-in of the other plug-ins are handled by the chainable plug-in registered with the component;

wherein the chainable plug-in is chained based on the resource data, the events, or both, and based upon resource types handled by the chainable plug-in and resource types handled by the other chainable plug-ins;

wherein the additional resource types are defined by the proper order of the two or more chainable plug-ins of the chain.

18. The method of claim 17, comprising determining a subset of the other plug-ins useful to transform the resource data or generate the additional events based upon a generalized object model that defines the resource data or events.

19. The method of claim 18, comprising chaining the subset of the other plug-ins, such that the subset of the other plug-ins in combination with the chainable plug-in is enabled to handle resource data or events of any type in the generalized object model.

* * * * *